(12) United States Patent
Bharadwaj et al.

(10) Patent No.: US 11,552,770 B2
(45) Date of Patent: Jan. 10, 2023

(54) FRONT LOADED CSI-RS BASED FEEDBACK

(71) Applicant: QUALCOMM Incorporated, San Diego, CA (US)

(72) Inventors: Arjun Bharadwaj, Poway, CA (US); Kapil Gulati, Hillsborough, NJ (US); Sudhir Kumar Baghel, Hillsborough, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/512,003

(22) Filed: Jul. 15, 2019

(65) Prior Publication Data

US 2020/0028657 A1 Jan. 23, 2020

Related U.S. Application Data

(60) Provisional application No. 62/701,520, filed on Jul. 20, 2018.

(51) Int. Cl.
*H04L 5/00* (2006.01)
*H04B 7/06* (2006.01)
(Continued)

(52) U.S. Cl.
CPC ......... *H04L 5/0082* (2013.01); *H04B 7/0486* (2013.01); *H04B 7/0626* (2013.01);
(Continued)

(58) Field of Classification Search
CPC ... H04L 5/0082; H04L 5/0051; H04L 1/0003; H04L 5/0055; H04L 5/0048;
(Continued)

(56) References Cited

U.S. PATENT DOCUMENTS

| 2015/0078279 A1* | 3/2015 | Ko ......... H04W 76/14 370/329 |
| 2016/0219641 A1* | 7/2016 | Chae ...... H04W 72/14 |

(Continued)

FOREIGN PATENT DOCUMENTS

WO 2019075238 A1 4/2019

OTHER PUBLICATIONS

International Search Report and Written Opinion—PCT/US2019/042014—ISA/EPO—Oct. 11, 2019.

*Primary Examiner* — Sharmin Chowdhury
(74) *Attorney, Agent, or Firm* — ArentFox Schiff LLP

(57) ABSTRACT

A method, a computer-readable medium, and an apparatus may involve wireless communication in a bundled TTI comprising a first TTI and a second TTI. A first UE may be configured to receive a first data transmission and a first reference signal from a second UE in the first TTI, to transmit a feedback to the second UE, and to receive a second data transmission having one or more transmission parameters adapted based on the feedback in the second TTI. In certain aspects, the first UE may be configured to transmit a first data transmission and a first reference signal to a second UE in the first TTI, to receive a feedback from the second UE, to adapt one or more transmission parameters for a second data transmission in the second TTI based on the feedback, and to transmit the second data transmission to the second UE in the second TTI.

28 Claims, 17 Drawing Sheets

(51) Int. Cl.
H04W 4/46 (2018.01)
H04L 1/00 (2006.01)
H04B 7/0456 (2017.01)

(52) U.S. Cl.
CPC ......... *H04B 7/0632* (2013.01); *H04B 7/0639* (2013.01); *H04L 1/0003* (2013.01); *H04L 5/0051* (2013.01); *H04L 5/0055* (2013.01); *H04W 4/46* (2018.02)

(58) Field of Classification Search
CPC ... H04L 5/0053; H04L 1/0031; H04L 1/1861; H04L 1/0026; H04B 7/0626; H04B 7/0639; H04B 7/0632; H04B 7/0486; H04B 7/0456; H04B 7/063; H04W 4/46; H04W 4/40
See application file for complete search history.

(56) References Cited

U.S. PATENT DOCUMENTS

| | | | |
|---|---|---|---|
| 2017/0111160 A1* | 4/2017 | Chen | H04L 1/1812 |
| 2017/0208568 A1* | 7/2017 | Nam | H04L 5/0094 |
| 2018/0035427 A1 | 2/2018 | Gupta et al. | |
| 2018/0331807 A1* | 11/2018 | Kim | H04W 72/04 |
| 2019/0013908 A1* | 1/2019 | Xiong | H04L 5/0042 |
| 2019/0124673 A1* | 4/2019 | Seo | H04W 72/1263 |
| 2019/0173547 A1* | 6/2019 | Li | H04B 7/0413 |
| 2019/0229964 A1* | 7/2019 | Ouchi | H04L 27/2613 |
| 2020/0022089 A1* | 1/2020 | Guo | H04W 52/346 |
| 2020/0107351 A1* | 4/2020 | Lee | H04L 5/0082 |
| 2020/0288458 A1* | 9/2020 | Takeda | H04W 72/0413 |
| 2020/0305176 A1* | 9/2020 | Hu | H04B 7/0456 |

* cited by examiner

FRONT LOADED CSI-RS BASED FEEDBACK

CROSS-REFERENCE TO RELATED APPLICATION(S)

This application claims the benefit of U.S. Provisional Application Ser. No. 62/701,520, entitled "FRONT LOADED CSI-RS BASED FEEDBACK" and filed on Jul. 20, 2018, which is expressly incorporated by reference herein in its entirety.

BACKGROUND

Technical Field

The present disclosure relates generally to communication systems, and more particularly, to methods and apparatus related to feedback for vehicle-to-everything (V2X) communication or vehicle-to-vehicle (V2V) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various features and aspects related to a front loaded Channel State Information-Reference Signal (CSI-RS) based feedback in a wireless communication system (e.g., including vehicular systems such as vehicle-to-vehicle (V2V) and/or vehicle-to-everything (V2X) networks) are described. For example, a user equipment (UE) may apply channel knowledge based on received feedback to adjust a modulation and coding scheme (MCS), modulation, code rate, rank and/or precoding to improve performance beyond a single port, non-precoded transmission. For example, a link level scheme may be used that applies precoding based on feedback received from a receiver UE. The feedback may be based on the CSI-RS transmissions in a first Transmission Time Interval (TTI) and may be used to determine improved transmission precoding, rank, etc. Closed Loop Spatial Multiplexing (CLSM) may improve performance, e.g., if link adaptation is accurately mapped to the channel. For example, the front loaded CSI-RS based feedback may enable the transmitter UE to adapt precoding and/or rank based on feedback for any of a Precoding Matrix Indicator (PMI), a rank indicator (RI), or a Channel Quality Indicator (CQI).

In an aspect of the disclosure, a method, a computer-readable medium, and an apparatus are provided. The apparatus may be a first UE (e.g., a vehicle in a V2V/V2X network) communicating using a bundled TTI comprising at least a first TTI and a second TTI. The first UE is configured to receive, at the first UE, a first data transmission directly from a second UE, to receive, at the first UE, a first reference signal directly from the second UE, to transmit a feedback to the second UE based on the first reference signal, and to receive a second data transmission from the second UE. The second data transmission may have one or more transmission parameters adapted based on the feedback transmitted to the second UE.

In another aspect of the disclosure, a method, a computer-readable medium, and an apparatus are provided. The apparatus may be a first UE (e.g., a vehicle in a V2V/V2X network) communicating using a bundled TTI comprising at least a first TTI and a second TTI. The first UE is configured to transmit a first data transmission directly to a second UE, to transmit a first reference signal directly to the second UE, to receive a feedback from the second UE based on the first reference signal, to adapt one or more transmission parameters based on the feedback received from the second UE, and to transmit the second data transmission to the second UE. The second data transmission may have one or more transmission parameters adapted based on the feedback received from the second UE.

Various additional aspects and features are described in the following detailed description.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
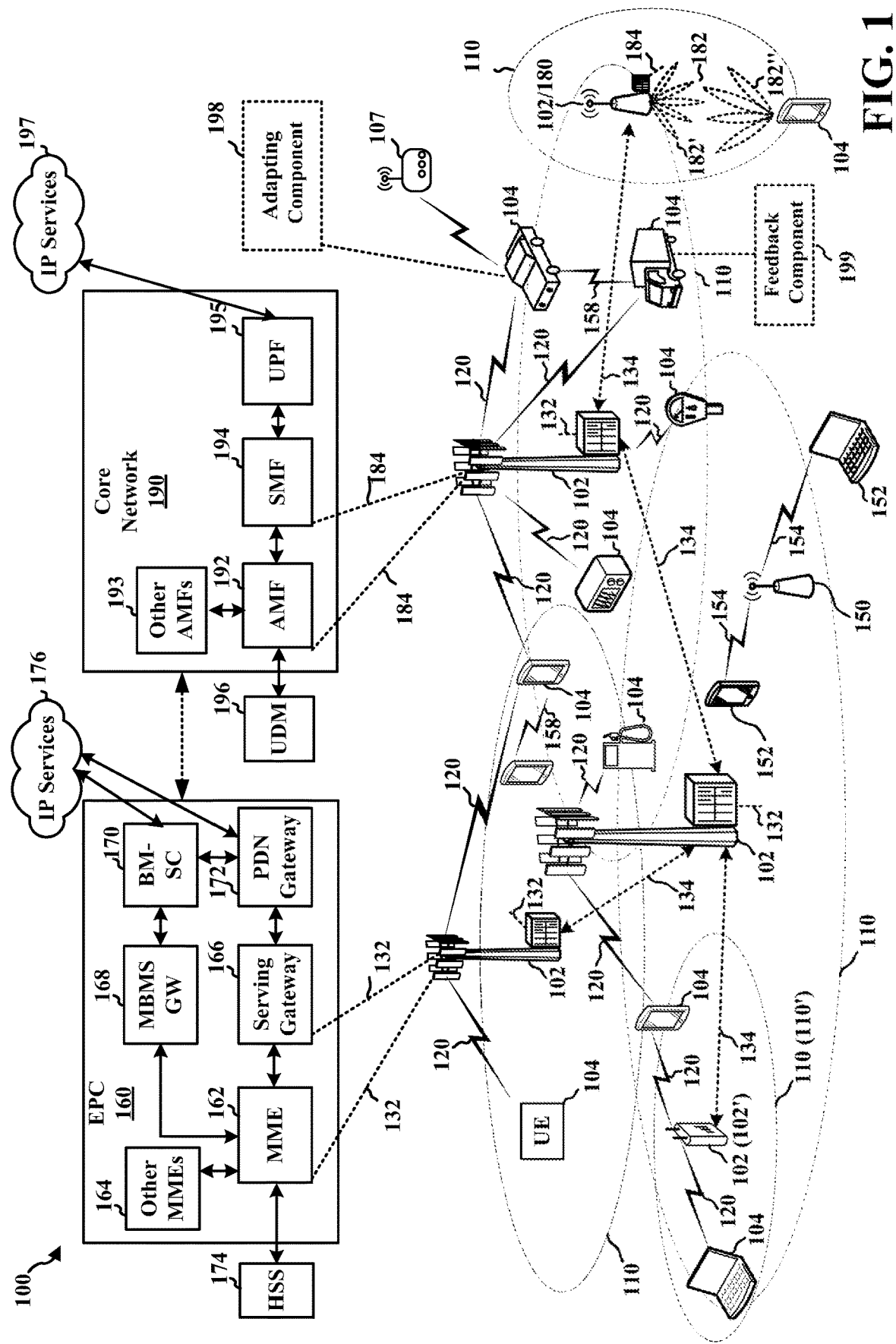
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with any of the examples in FIGS. 5A-5G.

Referring again to FIG. 1, in certain aspects, a first UE 104 (e.g., such as the UE 104 which may be a vehicle or a device installed in a vehicle in a V2V/V2X network) may communicate with a second UE (e.g., such as the UE 104' which may be a vehicle or a device installed in a vehicle in a V2V/V2X network) using V2X communication or a V2V communication link 158. For example, the first UE 104 may transmit a first data transmission and a first reference signal to a second UE 104', and receive a feedback from the second UE 104' based on the first reference signal. The first UE 104 may comprise an adapting component 198 configured to adapt one or more transmission parameters based on the feedback received from the second UE. The first UE 104 may transmit a second data transmission with the adapted transmission parameter(s) to the second UE 104'. In some aspects, the second UE 104' may receive the first data transmission and the first reference signal from the first UE 104. The second UE 104' may comprise a feedback component 199 configured to transmit the feedback, via a transmission component, to the first UE 104 based on the first reference signal. The second UE 104' may receive the second data transmission from the first UE 104. For example, the second data transmission may have adjusted transmission parameter(s) based on the feedback.

Figure 2C:
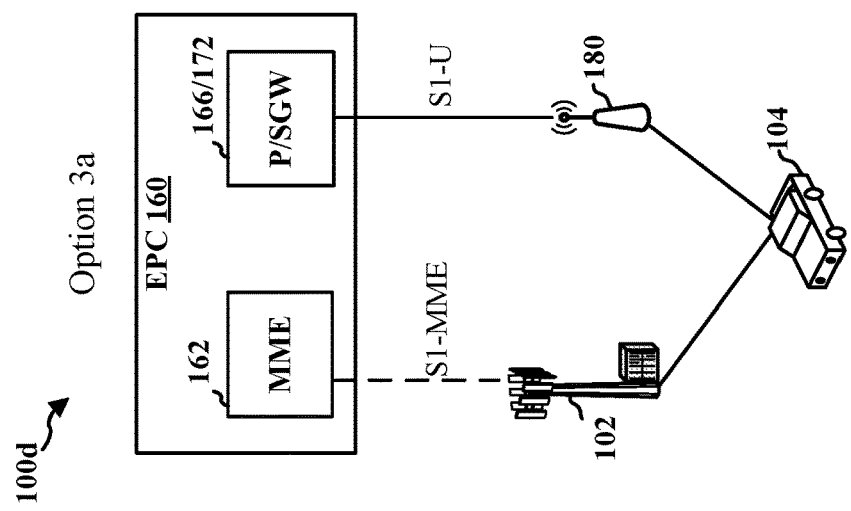
FIGS. 2A-2C are diagrams illustrating examples of some architecture options that may be used with the access network of FIG. 1.
Figure 2B:
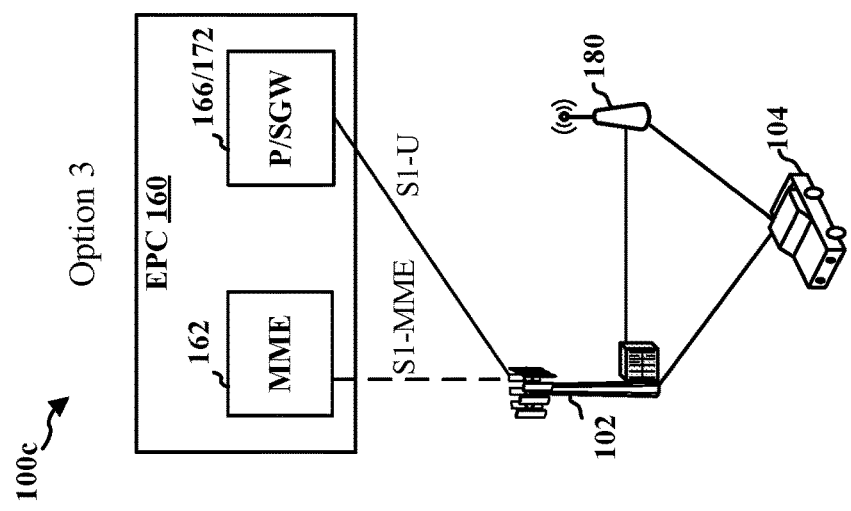
Figure 2A:
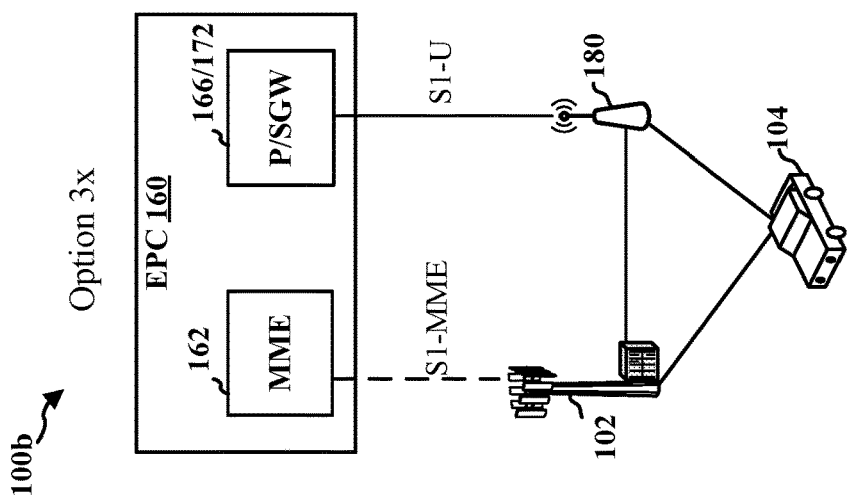

FIGS. 2A-2C are diagrams 100b, 100c, and 100d illustrating examples of non-standalone (NSA) architecture deployment which may be used in the access network of 100 of FIG. 1. In some configurations, the UE 104 may simultaneously connect to a first base station (e.g., eNB) via a first radio access technology (RAT) and a second base station (e.g., gNB) via a second RAT, as shown in FIGS. 2A-2C. For example, the first RAT may comprise and/or support LTE wireless access technology, and the second RAT may comprise and/or support 5G NR wireless access technology.

FIG. 2A illustrates a first option of an NSA architecture deployment that may be used in the access network 100 in some configurations. In this option, base station 180 (e.g., gNB) may have an S1-U connection to the core network (e.g., EPC 160) via the SGW 166/PGW 172. Base station 102 (e.g., eNB) may have an S1-MME connection to the EPC 160 via the MME 162. This configuration may comprise a DC, split bearer. Thus, with this option, the data may go through both the first base station 102 via LTE and the second base station 180 via 5G NR. The data may combine, or merge at the second base station 180, because the dual connectivity split bearer is anchored at the second base station 180. The consolidated data may be sent to the core network EPC 160 by the second base station 180.

FIG. 2B illustrates a second option of the NSA architecture deployment that may be used in the access network 100 in some configurations. In this option, data may similarly go through both the first base station 102 via LTE and the second base station 180 via 5G NR. However, in this example, the data may combine, or merge at the first base station 102 because the dual connectivity split bearer is anchored at the first base station 102. The consolidated data may be sent to the core network EPC 160 by the first base station 102.

FIG. 2C illustrates a third option of the NSA architecture deployment that may be used in the access network 100 in some configurations. In this option, the data may go through the second base station 180, and the second base station 180 may send the data the core network EPC 160.

Figure 3:
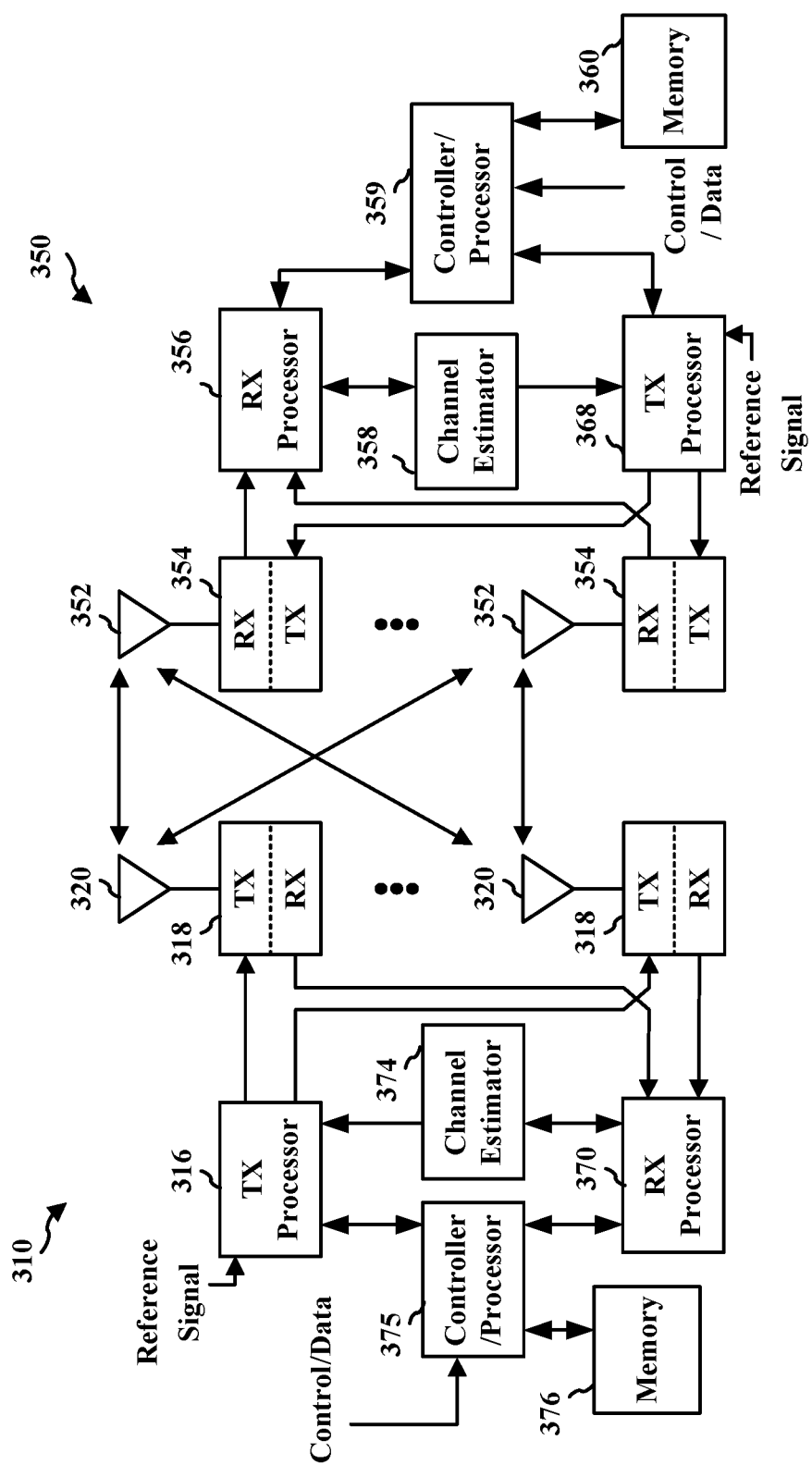
FIG. 3 is a diagram illustrating an example of a base station and UE in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/ processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198, or 199 of FIG. 1.

Described herein are various features and aspects related to a front loaded Channel State Information-Reference Signal (CSI-RS) based feedback in a wireless communication system (e.g., including vehicular systems such as vehicle-to-vehicle (V2V) and/or vehicle-to-everything (V2X) networks). For example, NR V2X may include unicast transmissions for which high throughput and high efficiency are beneficial. If a single port, non-precoded transmission is used, the data rate, capacity, or special efficiency may be limited. Aspects presented herein improve performance to achieve higher data rate, capacity, or special efficiency in communication. For example, the link design aspects presented herein may help V2X/V2V/D2D communication to have higher efficiency to support high spectral efficiencies at high speeds and high carrier frequencies.

A transmitting UE may apply channel knowledge based on received feedback to adjust an MCS, modulation, code rate, rank and/or precoding to improve performance beyond a single port, non-precoded transmission. For example, a link level scheme may be used that enables the transmitting UE to apply precoding based on feedback received directly from a receiver UE. The feedback may be based on the CSI-RS transmissions in a first TTI and may be used to determine improved transmission precoding, rank, etc. Applying channel knowledge to the an MCS, modulation, code rate, rank and/or precoding determination may advantageously improve performance over a single port non-precoded transmission. In this way, the data rate, capacity, or special efficiency in communication may be improved.

In some aspects, CLSM may improve performance, e.g., if link adaptation is accurately mapped to the channel. In some aspects, the front loaded CSI-RS based feedback may enable the transmitter UE to adapt precoding and/or rank based on feedback for any of a Precoding Matrix Indicator (PMI), a rank indicator (RI), or a Channel Quality Indicator (CQI).

Figure 4:
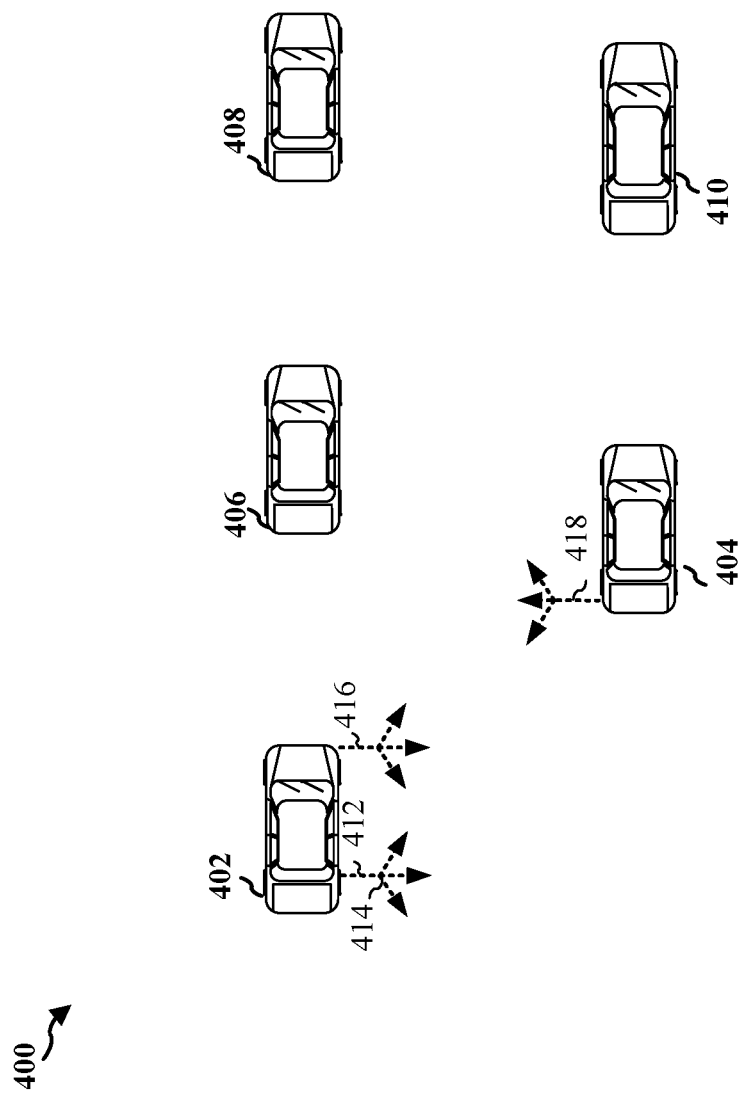
FIG. 4 illustrates an example of signaling between UEs (e.g., vehicles), in accordance with one aspect.

FIG. 4 illustrates a diagram 400 of an example of signaling between UEs (e.g., UEs 402, 404, 406, 408, and 410) based on V2X/V2V/D2D communication. In one aspect, a first UE 402, which may be a vehicle or a device installed in a vehicle in a V2V/V2X network, may transmit a first data transmission 412 and a first reference signal 414 directly to a second UE 404, e.g., in a first TTI, receive a feedback 418 from the second UE 404 based on the first reference signal 414, to adapt one or more transmission parameters based on the feedback 418 received from the second UE 404, and to transmit a second data transmission 416 directly to the second UE 404, e.g., in the second TTI or a subsequent TTI. In some aspects, the second UE 404 may receive the first data transmission 412 and the first reference signal 414 directly from the first UE 402, transmit the feedback 418 to the first UE 402 based on the first reference signal 414, and receive the second data transmission 416 directly from the first UE 402, e.g., in the second TTI or a subsequent TTI. For example, the first UE 402 may communicate with the second UE 404 using V2X communication or V2V communication.

Figure 5A:
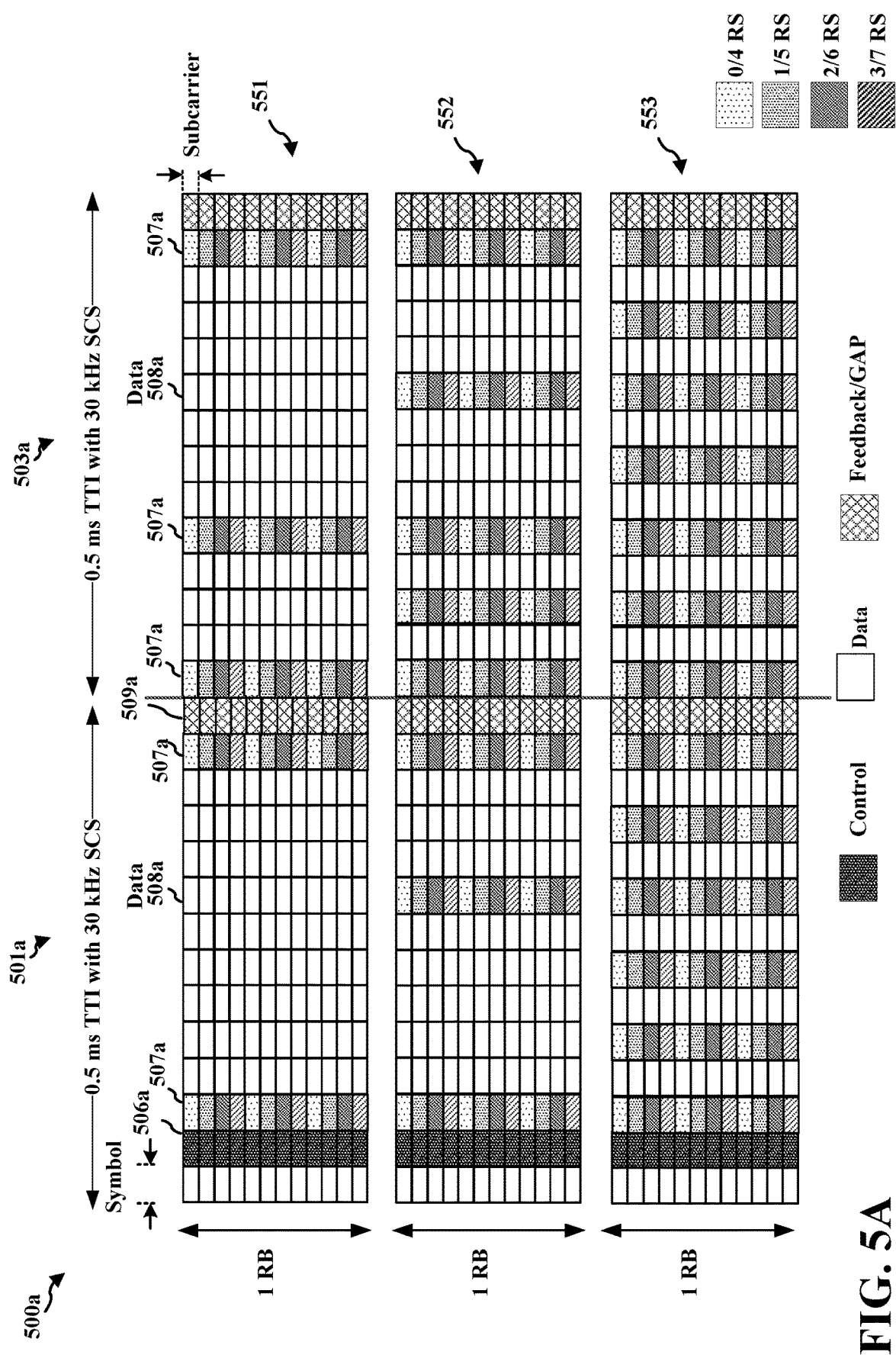
FIG. 5A illustrates an example of a link design in a bundled TTI comprising a first TTI and a second TTI.

FIG. 5A illustrates a diagram 500a of example link designs for a bundled TTI comprising a first TTI 501a and a second TTI 503a. FIG. 5A illustrates a first example reference signal pattern 551, a second example reference signal pattern 552, and a third example reference signal pattern 553. For V2X communication or V2V communication, aspects of the link design may enable high efficiency to support high spectral efficiencies at high speeds and a high carrier frequency. The frame structure illustrated in FIG. 5A may be used, e.g., for sidelink communication. FIG. 5 illustrates two TTIs, each being 5 ms and including 14 symbols. A TTI may correspond to a slot. A resource grid may be used to represent a frame structure. The resource grid may include a resource block (RB) (also referred to as physical RBs (PRBs)) that extend 12 consecutive subcarriers. The resource grid may be divided into multiple resource elements (REs). The number of bits carried by each RE may depend on a modulation scheme. As illustrated, REs may be used to transmit control reference signals and. A gap may be provided that enables a device to switch from operating as a transmitting device to prepare to operate as a receiving device. Data may be transmitted in the remaining REs, e.g., as illustrated. Multiple TTIs may be aggregated together. FIG. 5A illustrates an aggregation of two TTIs. However, the aggregated number of TTIs may be larger than two. As well, multiple RBs may be used for transmissions.

The bundled TTI may comprise at least one symbol for control signaling 506a. As illustrated, the control signaling 506a may be comprised in the first TTI 501a. Each TTI 501a, 503a may comprise data 508a and reference signals 507a. FIG. 5A illustrates a number of examples having different densities of reference signals 507a within the data 508a, such as in example 552 or 553 in comparison to example 551. For example, as illustrated in FIG. 5A, for higher speed, reference signals 507a may be transmitted in a more dense pattern. The bundled TTI may be used for improved link budget and reduced overhead. Interference may change every TTI. Thus, a reference signal pattern may be chosen for each TTI. Channel and noise may be estimated for each TTI. For example, the control 506a may be configured to indicate a number of TTI bundles and RS pattern, transparent mode (TM), a modulation and coding scheme (MCS), a number of ports, a number of layers for data, CSI-RS configuration, feedback mode, etc. A symbol may be used as a gap period 509a to allow for the transmitter UE and receiver UE to turnaround from transmit-to-receive or vice-versa, respectively, or to accommodate for ACK/NACK feedback from a receiving UE in one of the previous TTIs.

Figure 5B:
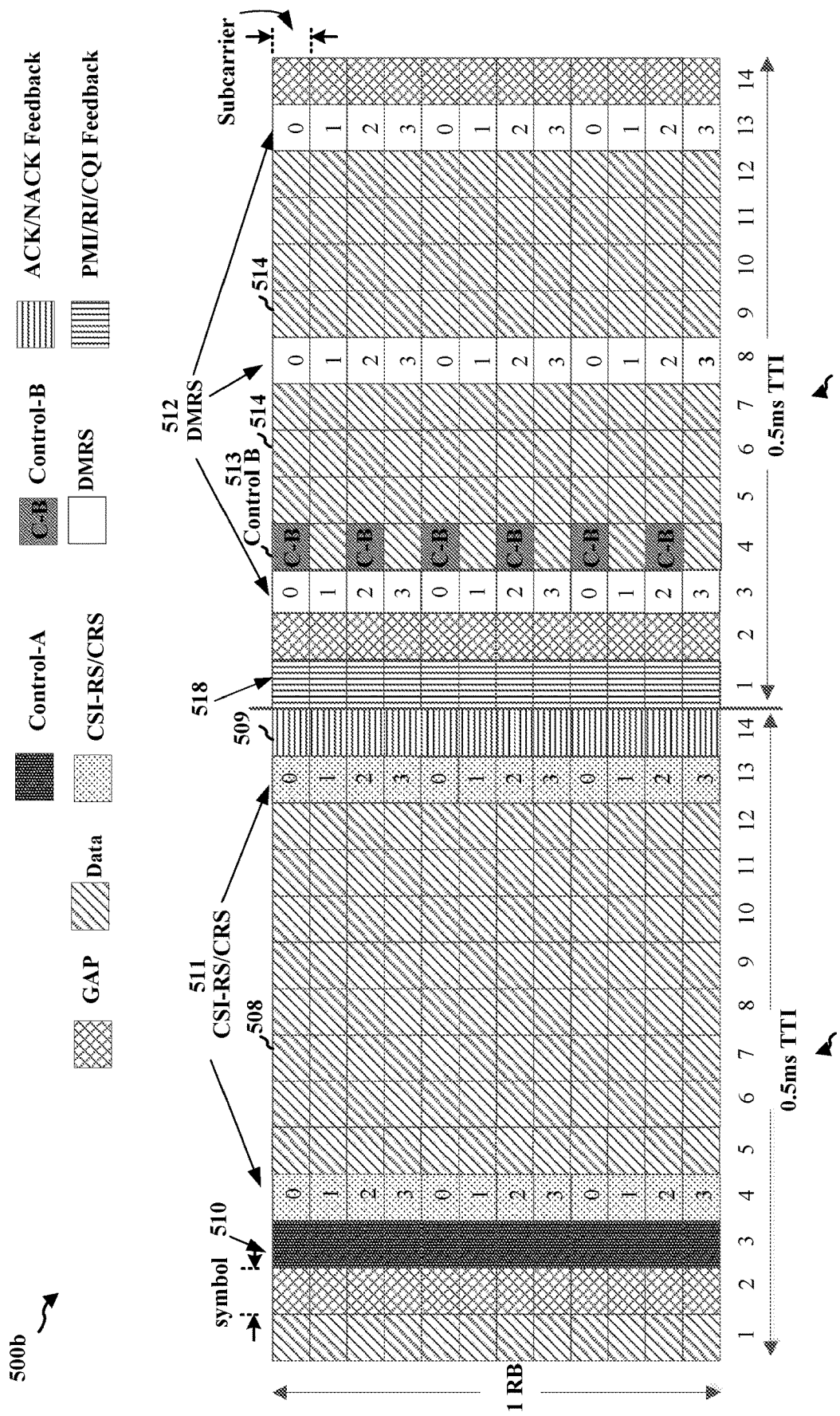
FIG. 5B-5G illustrate examples of a front loaded feedback link design in a bundled TTI comprising a first TTI and a second TTI.

FIG. 5B illustrate an example 500b of a link design including a front loaded CSI-RS based feedback 518 in a bundled TTI comprising a first TTI 501b and a second TTI 503b. For example, NR V2X communication may include unicast transmissions for which high throughput and high efficiency are beneficial. Applying channel knowledge to the an MCS, modulation, code rate, rank and/or precoding determination can advantageously improve performance over a single port non-precoded transmission. Closed loop spatial multiplexing can improve performance if link adaptation is accurately mapped to the channel. The TTI may comprise a first control signaling 510. The control signaling 510 may be similar to control signaling 506a in FIG. 5A. The transmitter UE may transmit a first data transmission 508 and a first reference signal 511 directly to a receiver UE, e.g., in the first TTI 501b. The first reference signal may comprise CSI-RS. The first reference signal may also comprise another reference signal to assist the UE in decoding the data, e.g., such as CRS or DMRS. The receiver UE may transmit feedback 518 based on the first reference signal 511. For example, the receiver UE may determine precoding and/or rank and/or channel quality based on CSI-RS in 511, and send the information in the feedback 518. For example, the front loaded CSI-RS based feedback 518 can enable the transmitter UE to adapt an MCS, modulation, code rate, rank and/or precoding within bundled TTI based on in-time precoding/rank/channel quality (PMI/RI/CQI) feedback 518. The transmitter UE may also adapt a DMRS pattern density. The feedback 518 may also provide speed/velocity information to aid the transmitter UE in selecting the right pattern. The feedback 518 may comprise one or more of a PMI, a RI, or a CQI.

As shown in FIG. 5B, the link level scheme may apply precoding based on the feedback 518 received from the receiver UE. The feedback 518 may be used by the transmitting UE to determine adapted transmission precoding/rank based on the CSI-RS transmissions in the first TTI 501b. As shown in FIG. 5B, the feedback 518 may be transmitted in the second TTI, e.g., in a first symbol in the second TTI 503b. For example, the feedback 518 may be transmitted after an acknowledgment or Negative acknowledgment (ACK/NACK) feedback 509 from the receiver UE.

The transmitter UE may also transmit additional reference signals, e.g., a third reference signal. in the first TTI. For example, the third reference signal may be configured for decoding data in the first TTI 501b, and the CSI-RS may be multiplexed with the third reference signal. Thus, both reference signals may be transmitted together in the same symbol(s).

For example, the first reference signal 511 might not comprise precoding. For another example, the first reference signal may be beamformed with a specific precoding that is known to the receiver UE. As an example, the first reference signal may comprise a cyclical precoding mechanism or a semi-static precoding known to the first UE. FIG. 5B illustrates that the reference signal may cycle through precoding, e.g., based on a defined codebook. FIG. 5B illustrates an index of 0, 1, 2, 3 corresponding to four ports. In other examples, different numbers of layers may be used. In an example with two layers, indices 2 and 3 might not be transmitted. For example, precoding may also be signaled as part of control signaling if the same precoding is likely to be applied across the allocation. For example, the order of precoder cycling may be agreed among the transmitter UE and the receiver UE.

In some aspects, the transmitter UE may receive the feedback 518 and adapt one or more transmission parameters, e.g., for a second data transmission 514 in the second TTI 503b, based on the feedback 518 received from the receiver UE. The transmitter UE may transmit the second data transmission to the receiver UE, e.g., in the second TTI 503b. For example, the first UE 402 may communicate with the second UE 404 using V2X communication or V2V communication.

For example, the transmitter UE may transmit a second reference signal 512 to the receiver UE in the second TTI 503b. The second reference signal may have one or more parameters that have been adjusted based on the feedback 518, corresponding to the adjustment made for the data 514. For example, the second reference signal may comprise precoding adapted based on the feedback 518. The second reference signal may be precoded to indicate any change in PMI/RI/CQI. The second TTI 503b may also comprise a second control signaling 513.

As shown in FIG. 5B, the transmitter UE may transmit a first control signal 510 (control-A) indicating at least one of a target UE identification, a reference signal pattern, a transparent mode (TM), a rank indicator, a layer mapping and a precoding type. For example, the first control signal may be transmitted in the first TTI 501b. An adjustment to the one or more transmission parameters may also be indicated in control signals. For example, the transmitter UE may further transmit a second control signal 513 indicating an adjustment to the one or more transmission parameters for the second data transmission 514 based on the feedback 518. For example, the second control signal 512 may be transmitted in the second TTI 503b. For example, the one or more transmission parameters adapted based on the feedback 518 may comprise one or more of a PMI, a RI, a modulation and coding scheme (MCS), a CQI, a number of layers, a number of ports, and a coding rate.

Once the feedback 518 (e.g., PMI/RI/CQI feedback) is received, for example, at the start of the second TTI 503b, the transmitter UE may apply the rank/precoding and/or adaptation to other transmission parameters immediately after a gap, which may pose some implementation challenges. If the transmitter UE cannot apply the link adaptation parameters, then the link adaptation parameters may be applied at the start of a third TTI (not shown). This solution may be applied to a bundled TTI with a larger number of TTIs. For example, the bundled TTI may further comprise a third TTI, and where the transmitter UE further adapts the one or more transmission parameters for the third TTI based on the feedback received from the receiver UE. Thus, the TTI having the adjusted transmission parameters may be separated by at least one TTI from the TTI on which the feedback is based.

In FIG. 5B, examples of locations of demodulation reference signal (DMRS) in the second TTI 503b are illustrated. Additional DMRS locations can be incorporated for higher speeds and/or MCS without modifying the baseline front loaded feedback design as shown in FIG. 5B. For example, DMRS 512 may be included with different densities, as described in connection with FIG. 5A. The additional DMRS locations may improve estimation of one or more of the PMI, the RI, or the CQI.

In one aspect, the feedback 518 (e.g., PMI/RI/CQI feedback) may be based on a predicted channel quality in the second TTI 503b (or next few TTIs). For example, the feedback from the receiving UE may comprise a prediction of a channel estimate for the second TTI 503b. Since temporal correlations of the channel are known, the PMI/CQI feedback may be based on the predicted channel in the next TTI (or next few TTIs). For example, the channel may be predicted by the receiving UE through interpolation.

Figure 5C:
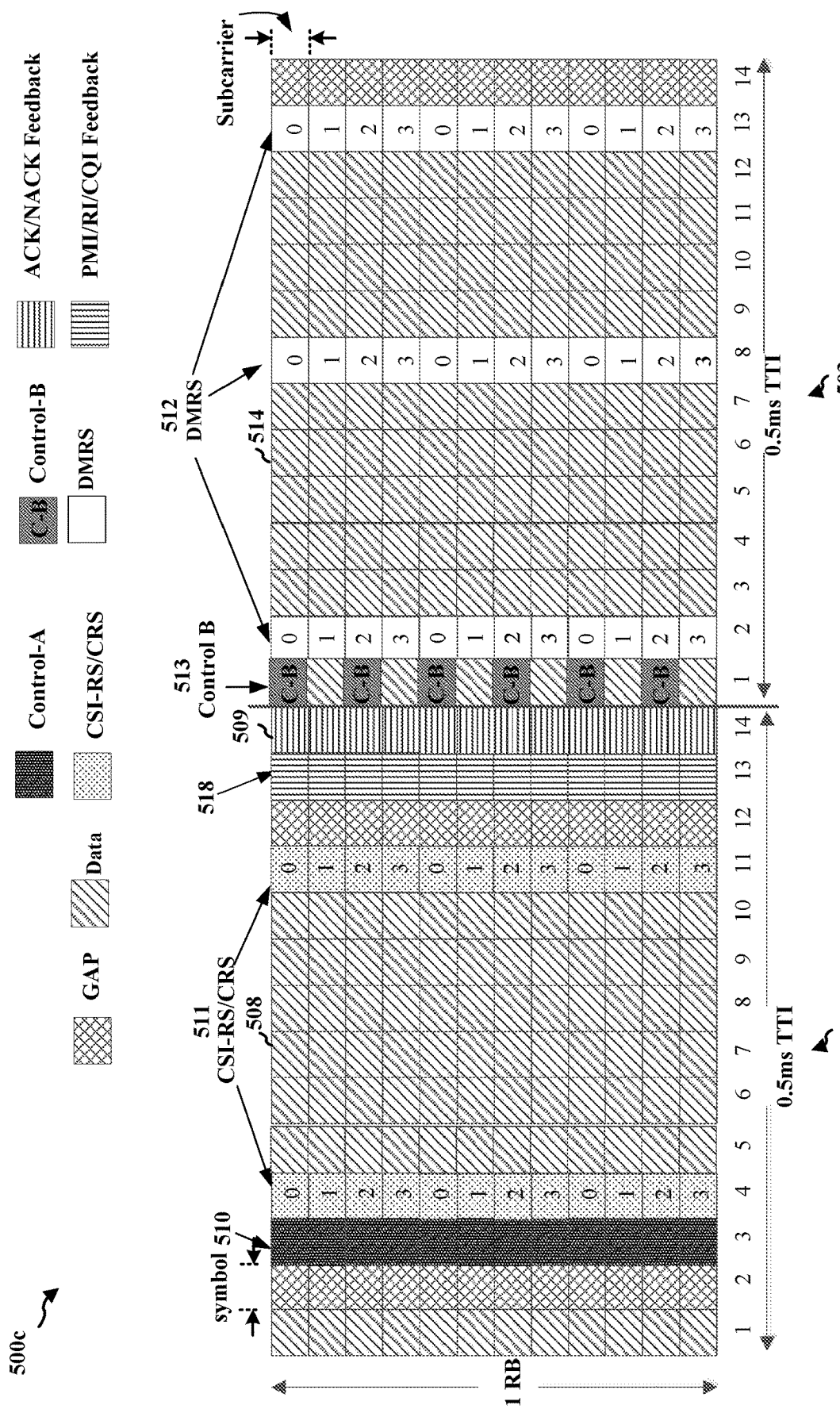

FIG. 5C illustrates another example 500c of a front loaded feedback link design in a bundled TTI comprising a first TTI 501c and a second TTI 503c. In one aspect, the second control signal 513 (e.g., Control-B) may be transmitted prior to transmission of a second reference signal 512 in the second TTI 503c. For example, the second control signal 513 may be transmitted before the DMRS symbol as shown in FIG. 5C. The DMRS may be used as a reference by the receiving UE for decoding the second control signal, because the second control signal 513 may be precoded. Transmitting the second control signal prior to the second reference signal may advantageously allow the transmitter UE some additional time to get the rank/MCS and/or other transmission parameters set up. Additionally or alternatively, the second control signal 513 (e.g., Control-B) may be transmitted at the start of the second TTI but without any refined precoding. In this way, the receiver UE may decode the control signal 513 while allowing the transmitter UE more time for MCS/rank and/or other transmission parameters adjustments.

Figures 5D, 5E:
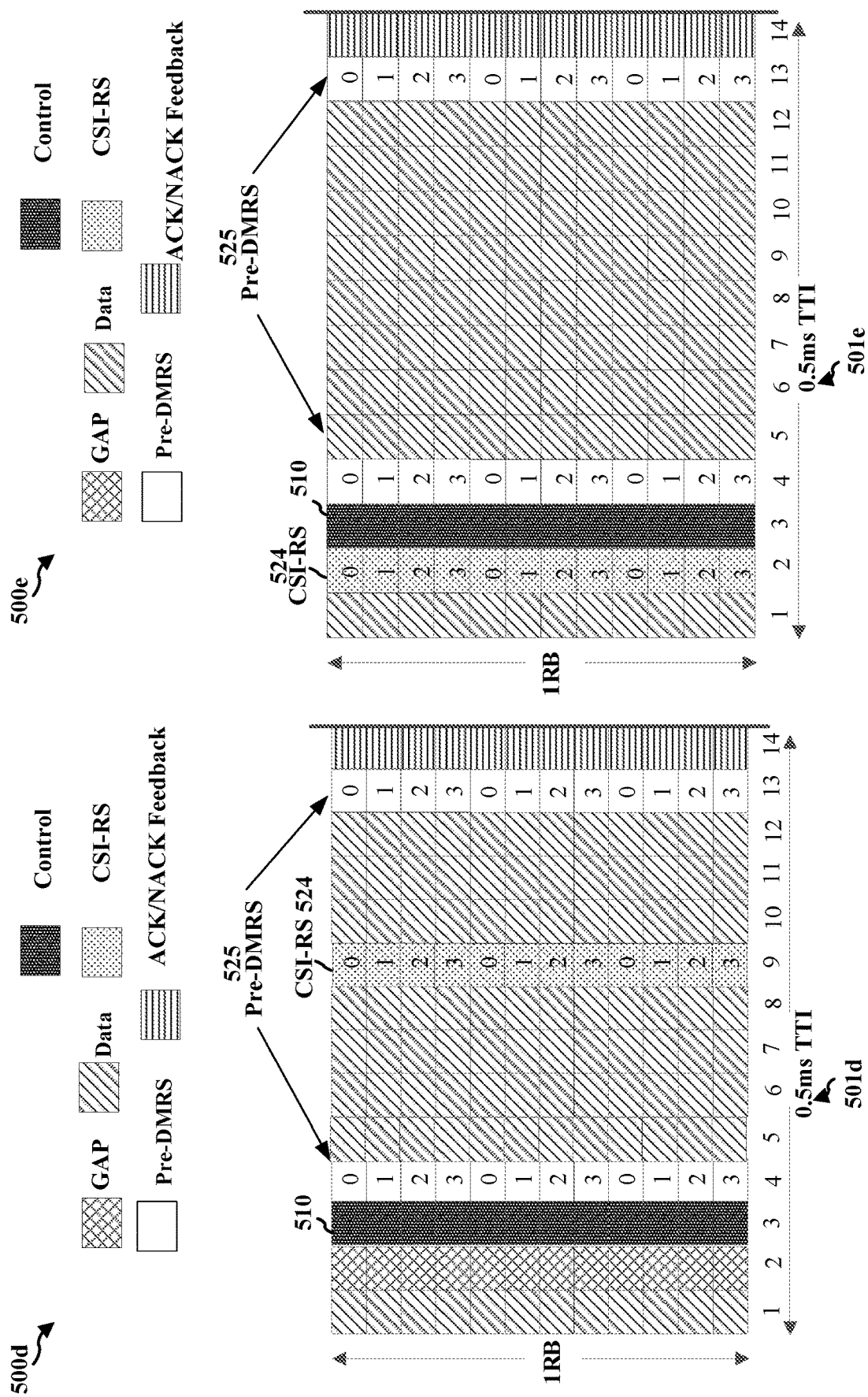

FIG. 5D illustrates another example 500d of a link design including a front loaded CSI-RS based feedback in a bundled TTI comprising a first TTI 501d and a second TTI (not shown). In one aspect, the CSI-RS 524 (e.g., a first reference signal) might not be multiplexed with the reference signal 525 (e.g., a third reference signal) for data decoding in the 1st TTI 501d, and the CSI-RS 524 may be located in another symbol. FIG. 5D illustrates the transmitter UE transmitting a third reference signal 525 in 5th symbol for decoding data in the first TTI 501d, e.g., DM-RS. The transmitter UE may transmit the CSI-RS 524 in a separate symbol than the third reference signal, for example, in the 9th symbol as shown in FIG. 5D FIG. 5E illustrates another example 500e of aspects of a front loaded feedback design in a bundled TTI comprising a first TTI 501e and a second TTI (not shown). In one aspect, the CSI-RS 524 (e.g., a first reference signal) may be transmitted in a symbol, e.g., a second symbol, in the first TTI 501e. Transmitting the CSI-RS in the second symbol may advantageously allow more time for the transmitter UE to adapt the transmission parameters (e.g., PMI/RI/CQI).

Figure 5F:
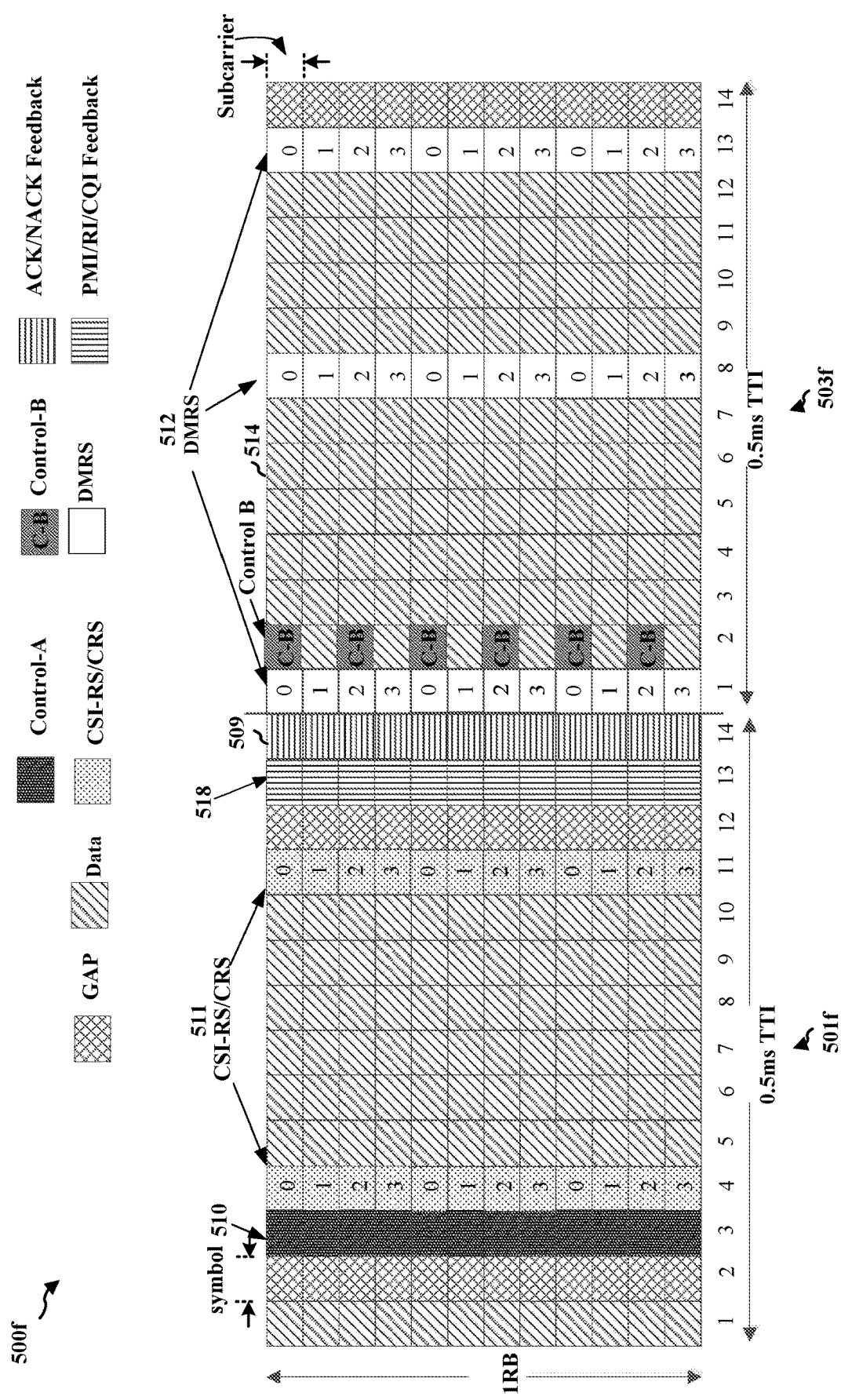

FIG. 5F illustrates another example 500f of a front loaded feedback design in a bundled TTI comprising a first TTI 501f and a second TTI 503f. In one aspect, the feedback 518 may be transmitted in the first TTI 501f, as shown in FIG. 5F. For example, the feedback 518 may be transmitted prior to an ACK/NACK feedback 509 from the receiver UE. Transmitting the feedback 518 in the first TTI may advantageously allow more time for the transmitter UE to adjust the transmission parameters (e.g., PMI/RI/CQI), and even possibly regenerate code words.

Figure 5G:
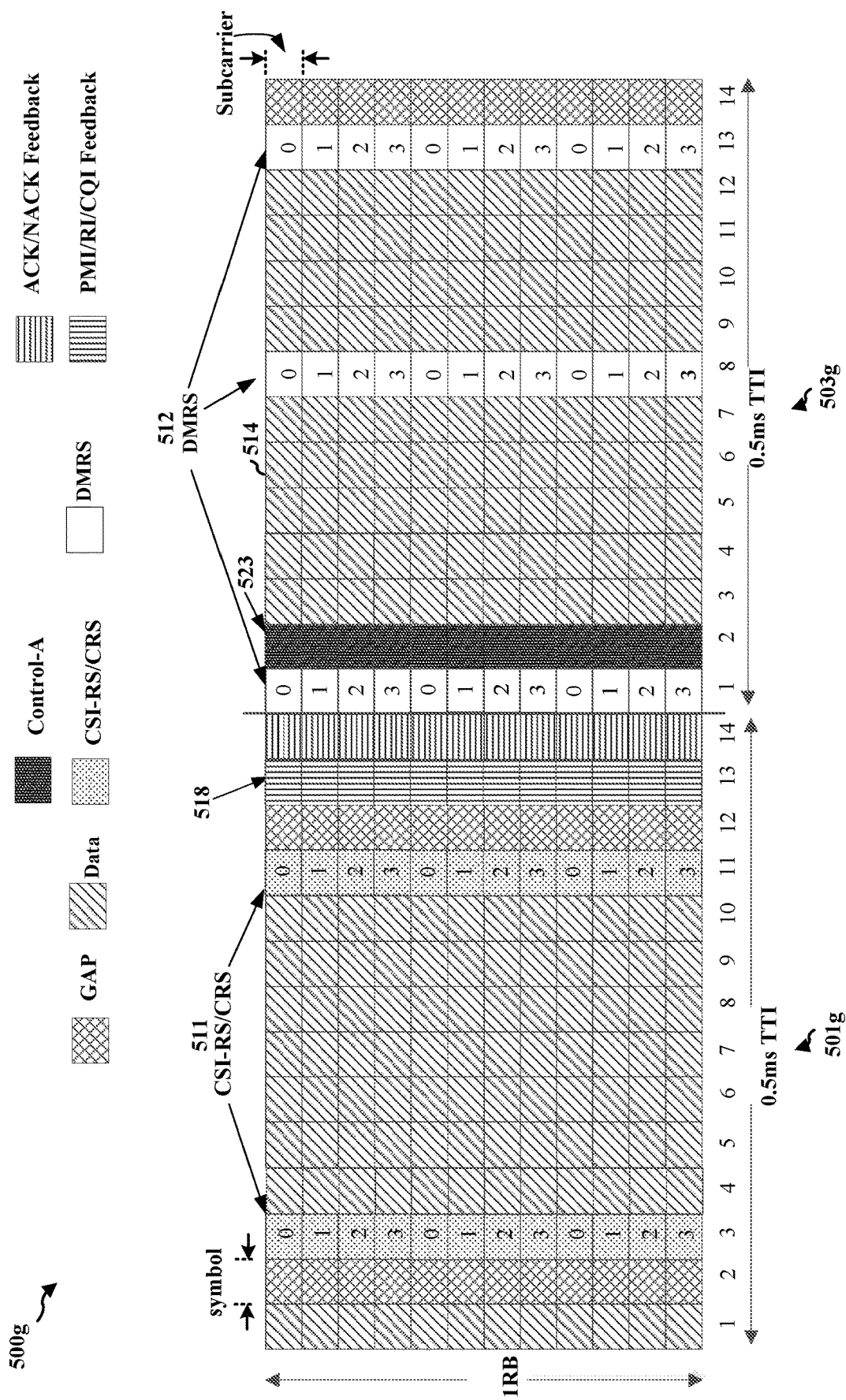

FIG. 5G illustrates another example 500g of a front loaded feedback link design in a bundled TTI comprising a first TTI 501g and a second TTI 503g. In one aspect, there may be no control signal transmitted in the first TTI 501g. A control signal 513 (e.g., Control-B) may be transmitted in a symbol in the second TTI 503g. For example, the transmitter UE may transmit a control signal 523 in the second TTI 503g without transmitting a control signal in the first TTI 501g. For example, the first UE may determine a TTI bundle size from the control signal. For example, control information as a whole might be transmitted at the start of the second TTI. For example, a second control signal may not be necessary. For example, control information may contain the necessary data to decode the first TTI as well as the enhanced information to decode data from second TTI onwards. For example, the receiver UE may store the data from the first TTI and attempt decoding only after it has decoded the control information.

Referring to FIGS. 5B-5G, in some aspects, the feedback channel 518 can be power controlled. For example the power of the transmitter UE can be modified based on at least one of a received reference signal received power (RSRP), a Received Signal Strength Indicator (RSSI) or a channel Signal-to-Noise Ratio (SNR).

For example, the front loaded CSI-RS based feedback 518 may increase overhead. CLSM may be applied when large amounts of data spanning multiple TTIs are to be communicated. For example, CLSM may be applied when the number of TTI is larger than a threshold number. For example, the transmitter UE may determine whether to use the feedback 518 to adjust the one or more transmission parameters for the second TTI 503b based on an amount of data to be sent to the receiver UE.

Referring to FIGS. 5B-5G, the front loaded CSI-RS based feedback 518 may advantageously enable more efficient communication in the second TTI than in the first TTI. For example, the transmission parameters can be adjusted dynamically based on the feedback that gives a precise reflection of the channel. As a result, the throughput of communication can be increased, and the reliability of the communication can be improved.

The link design including the front loaded CSI-RS based feedback may advantageously improve the throughput of the communication. For example, the transmitter UE may transmit a first control signal (e.g., control-A) in the first TTI, wherein the first control signal may further indicate a potential for early termination of a data transmission. For example, the first control signal (e.g., control-A) may indicate if early termination is possible due to the possibility of a rank increase based on the CSI-RS based feedback. Because the front loaded CSI-RS based feedback 518 enables the transmission parameters to be adjusted dynamically, the throughput may be increased. For example, several data streams or transmission layers may be used because of a rank increase. The higher throughput may result in earlier termination of the data transmission. The potential for early termination may be indicated in the first control signal (e.g., control-A) in addition to an anticipated duration of transmission (e.g., a number of TTIs in the bundle).

The transmitter UE may transmit a second control signal (e.g., control-B) in the second TTI, where the receiver UE may determine a TTI bundle size from the second control signal. For example, the receiver UE may attempt to decode the second control signal in the second TTI. The receiver UE may try to decode the second control signal (e.g., control-B) to determine the new TTI bundle size. For example, the receiver UE may receive each TTI independently in response to failure of decoding of the second control signal. If the second control signal (e.g., control-B) decoding fails, the receiver UE may treat each TTI independently (TTI bundling is not assumed).

The link design including the front loaded CSI-RS based feedback may advantageously improve the reliability of the communication. For example, in the front loaded CSI-RS based feedback link design scheme, a change or an adjustment in precoding may be transparent to the receiver UE. In one aspect, the second control signal (e.g. Control B) may not be transmitted in the second TTI. For example, the second TTI may be transmitted without a control signal. For example, the second reference signal may be used as the reference and may also be precoded in the same fashion as the data in the second TTI. For example, a duration and rank of the original transmission may remain the same but with improved reliability. In one aspect, the second data transmission may comprise an adjusted precoding parameter, where the second data transmission comprises a same rank as the first data transmission in the first TTI. For example, a TTI duration of the second TTI may be unchanged from the first TTI.

Figure 6:
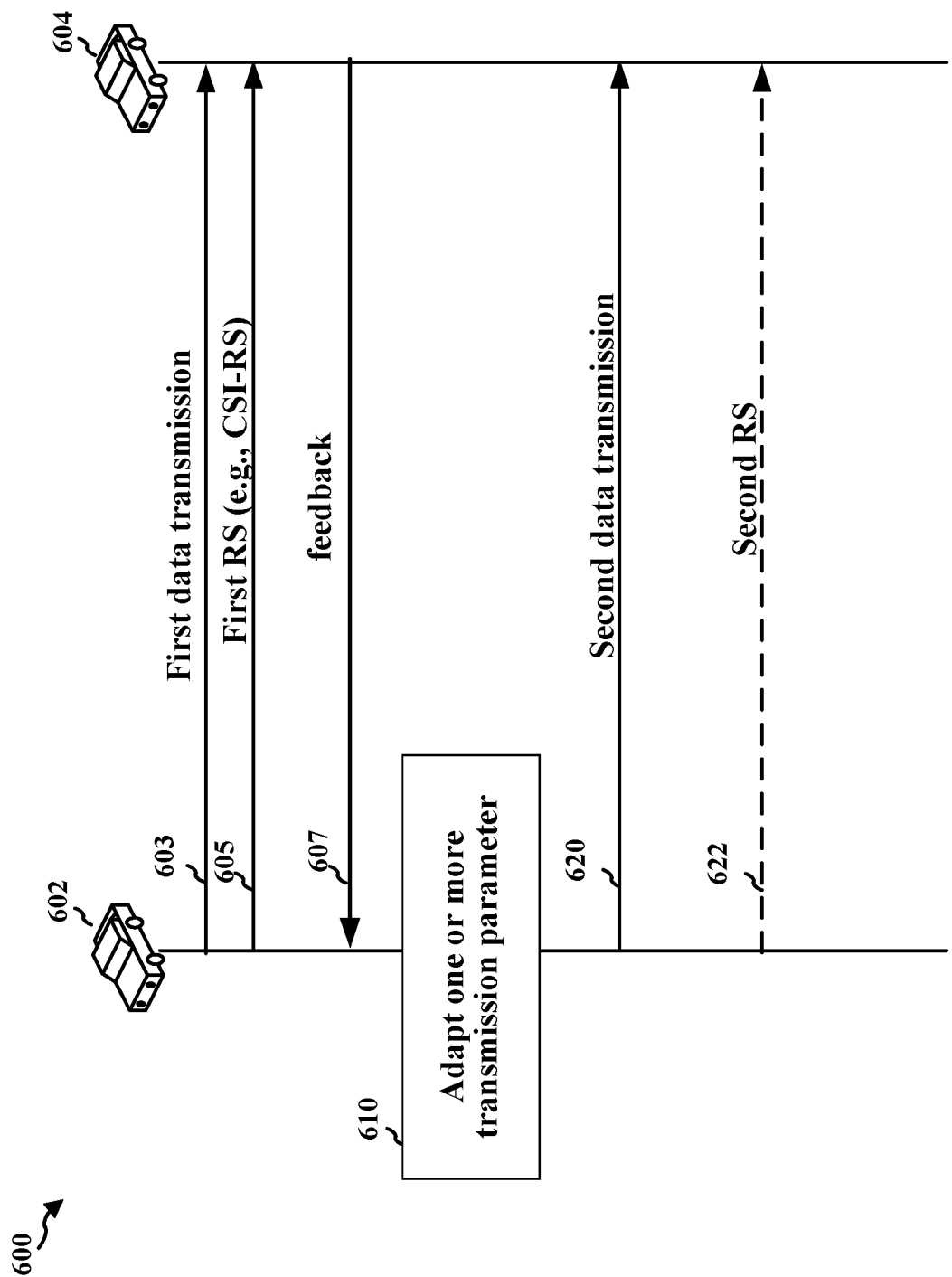
FIG. 6 illustrates an example communication flow 600 between a transmitting UE and a receiving UE in a front loaded feedback link design in a bundled TTI comprising a first TTI and a second TTI.

FIG. 6 illustrates an example communication flow 600 between a first UE 602 (e.g., 104, 402, etc.) and a second UE 604 (e.g., 104', 404, etc.) in a front loaded feedback link design in a bundled TTI comprising a first TTI and a second TTI in a wireless communication. The communication may be based on V2X, V2V, or D2D based communication directly from the first UE 602 to the second UE 604. The communication transmitting from UE 602, 604 may be broadcast and received by multiple receiving devices within range of a particular transmitting device, as described in connection with FIG. 4. The first UE 602, which may be a vehicle or a device installed in a vehicle in a V2V/V2X network, may transmit a first data transmission 603 and a first reference signal 605 to the second UE 604 in a first TTI. For example, the first reference signal 605 may be a CSI-RS signal, as described in connection with FIGS. 5B-5G. The second UE 604 may transmit a feedback 607 based on the first reference signal 605, as described in connection with any of FIGS. 5B-5G. The first UE 602 may adapt one or more transmission parameters for a second data transmission 620 in a second TTI based on the feedback 607 received from the second UE 604, as illustrated at 610. The first UE 602 may transmit the second data transmission 620 to the second UE 604 in the second TTI. For example, the second data transmission may have the one or more transmission parameters adapted based on the feedback received from the second UE. For example, the first UE 602 may transmit a second reference signal 622 to the second UE in the second TTI, where the second reference signal may have one or more parameters based on the feedback 607. The UE may use the one or more parameters of the second reference signal to determine the adjusted transmission parameters for decoding the data. The UE 602 may further transmit control signaling, e.g., 513, based on the adjusted transmission parameters.

Figure 7:
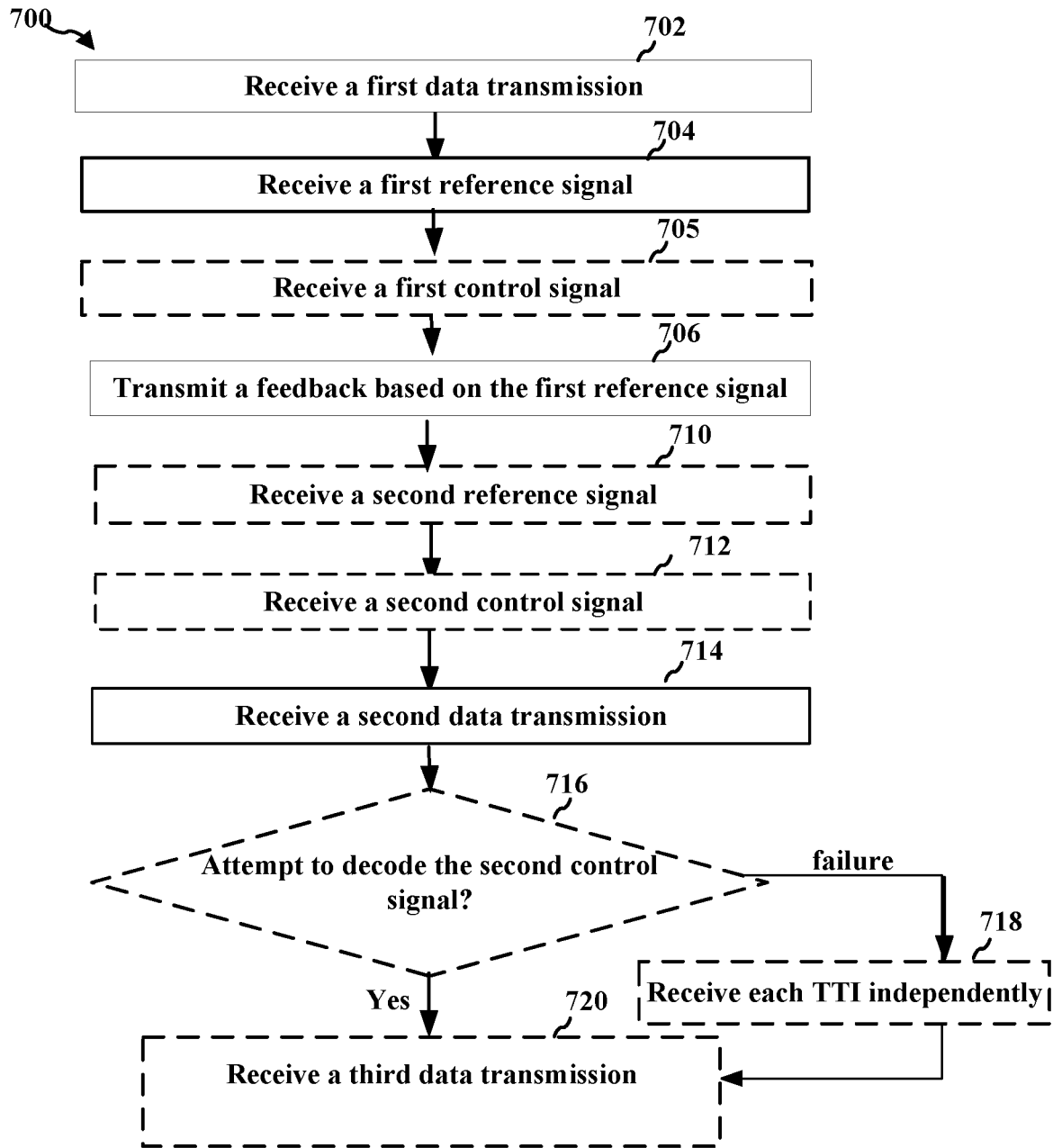
FIG. 7 is a flowchart of a method of wireless communication.

FIG. 7 is a flowchart 700 of a method of wireless communication at a first UE. The method may be performed, for example, by the first UE (e.g., UE 104', 350, 404, 604, the apparatus 802/802', the processing system 914, which may include the memory 360 and which may be the entire UE 350 or a component of the UE 350, such as the TX processor 368, the RX processor 356, and/or the controller/processor 359) communicating with a second UE (e.g., UE 104, 310, 402, 602, the apparatus 1102/1102', the processing system 1214, which may include the memory 360 and which may be the entire UE 310 or a component of the UE 310, such as the TX processor 316, the RX processor 370, and/or the controller/processor 375). The UE may communication using a bundled TTI comprising at least a first TTI and a second TTI. The wireless communication may comprise a V2V or V2X communication. To facilitate an understanding of the techniques and concepts described herein, the method of flowchart 700 may be discussed with reference to the examples illustrated in FIGS. 4, 5B-5G and 6. For discussion purposes, consider that the first UE may be the UE 604. Optional aspects may be illustrated in dashed lines.

In the method of flow chart 700, a link level scheme may be used that applies precoding based on feedback received from a receiver UE. The feedback may be based on the CSI-RS transmissions in the first TTI and may be used to determine improved transmission precoding, rank, etc. Applying channel knowledge to the MCS, modulation, code rate, rank and/or precoding determination may advantageously improve performance over a single port non-precoded transmission. In this way, the data rate, capacity, or special efficiency in communication may be improved.

At 702, the first UE may receive a first data transmission. For example, referring back to FIGS. 5B-5G and FIG. 6, a receiver UE 604 may receive a first data transmission 603 and a first reference signal 605 directly from a transmitter UE 602, e.g., in a first TTI 501b. For example, reception component 804 and/or data component 808 of apparatus 802 may perform the reception of the first data transmission.

At 704, the first UE may receive a first reference signal 511, 524 directly from the second UE, e.g., in the first TTI. For example, reception component 804 and/or RS component 810 of apparatus 802 may perform the reception of the reference signal from UE 850. For example, referring back to FIGS. 5B-5G and FIG. 6, the receiver UE 604 may receive a first reference signal 605 directly from a transmitter UE 602, e.g., in the first TTI 501b. For example, the first reference signal 605 may be a CSI-RS signal, as described in connection with FIGS. 5B-5G. In some aspects, the first reference signal may comprise a CSI-RS. For example, CSI-RS may be transmitted together with a reference signal for decoding the data in the first TTI. For example, the first UE may receive a third reference signal (e.g., CRS, DM-RS, etc.) in the first TTI for decoding data in the first TTI, where the CSI-RS is multiplexed with the third reference signal. FIGS. 5B, 5C, 5F, and 5G illustrate examples of CSI-RS transmitted together with another reference signal, such as CRS, for decoding data 508. For example, the first reference signal 511 might not comprise precoding. For example, the first reference signal may comprise a cyclical precoding mechanism or a semi-static precoding known to the first UE. For example, the first UE may receive a third reference signal 525, e.g., in the first TTI for decoding data in the first TTI, where the CSI-RS 524 is received in a separate symbol than the third reference signal. FIGS. 5D and 5E illustrate examples in which the CSI-RS 524 is transmitted separately from another reference signal, e.g., DM-RS 525. For example, the CSI-RS may be received prior to the third reference signal 525, e.g., in a second symbol of the first TTI, as illustrated in FIG. 5E.

At 705, the first UE may receive a first control signal indicating at least one of a target UE identification, a reference signal pattern, a transparent mode (TM), a rank indicator, a layer mapping and a precoding type, where the first control signal may be received, e.g., in the first TTI. For example, reception component 804 and/or control component 808 of apparatus 802 may perform the reception of the control signal from UE 850. For example, referring back to FIGS. 5B-5G and FIG. 6, the first UE may receive a first control signal 510, indicating at least one of a target UE identification, a reference signal pattern, a transparent mode (TM), a rank indicator, a layer mapping and a precoding type, where the first control signal may be received, e.g., in the first TTI. FIGS. 5B-5F illustrate examples in which the control signaling 510 is transmitted in the first TTI. In some aspects, the first UE may receive the first control signal 510, e.g., in the first TTI, where the first control signal may further indicate a potential for early termination of a data transmission.

At 706, the first UE may transmit a feedback 518 to the second UE based on the first reference signal 511, 524. For example, transmission component 806 and/or feedback component 812 of apparatus 802 may perform the transmission of the feedback. For example, referring back to FIGS. 5B-5G and FIG. 6, the receiver UE may determine precoding and/or rank and/or channel quality based on CSI-RS in 511, and send the information in the feedback 607, 518. For example, the front loaded CSI-RS based feedback 518 can enable the transmitter UE to adapt precoding and/or rank within bundled TTI based on in-time precoding/rank/channel quality (PMI/RI/CQI) feedback 518. The feedback 518 may comprise one or more of a PMI, a RI, or a CQI. As shown in FIG. 5B, the link level scheme may apply precoding based on the feedback 518 received from the receiver UE. The feedback 518 may be used by the transmitting UE to determine adapted transmission precoding/rank based on the CSI-RS transmissions in the first TTI 501b. As shown in FIG. 5B, the feedback 518 may be transmitted in the second TTI, e.g., in a first symbol in the second TTI 503b. For example, the feedback 518 may be transmitted after an acknowledgment or Negative acknowledgment (ACK/NACK) feedback 509 from the receiver UE.

At 710, the first UE may receive a second reference signal directly from the second UE. For example, reception component 804 and/or RS component 810 of apparatus 802 may perform the reception of the second reference signal from UE 850. For example, referring back to FIGS. 5B-5G and FIG. 6, the first UE may receive a second reference signal 512, 622 from the second UE, e.g., in the second TTI, where the second reference signal may have one or more parameters based on the feedback 518 transmitted to the second UE. For example, the feedback may comprise one or more of a PMI, a RI, or a CQI. For example, the second reference signal may comprise precoding adapted based on the feedback. For example, the feedback 518 may be transmitted in the first symbol in the second TTI, as illustrated in FIG. 5B. For example, the feedback may be transmitted after an acknowledgment or Negative acknowledgment (ACK/NACK) 509 from the receiver UE.

At 712, the first UE may receive a second control signal. For example, reception component 804 and/or control component 808 of apparatus 802 may perform the reception of the second control signal from UE 850. For example, referring back to FIGS. 5B-5G and FIG. 6, the first UE may receive a second control signal 513, indicating an adjustment to the one or more transmission parameters for the second data transmission based on the feedback. For example, the second control signal may be received in the second TTI. For example, the one or more transmission parameters adapted based on the feedback may comprise any combination of a PMI, a RI, a CQI, a modulation and coding scheme (MCS), a number of layers, a number of ports, and a coding rate. The second control signal 513 may be received after the second reference signal 512, as in FIGS. 5B, 5F, and 5G. In another example, the second control signal 513 may be received in a symbol prior to a second reference signal 512 in the second TTI, as illustrated in the example in FIG. 5C. For example, the second control signal 513 may comprise precoding, where the precoding may be determined based on the second reference signal 512. For example, the second control signal 513 may be received without precoding. For example, the first UE may receive the second control signal 513, e.g., in the second TTI, where the first UE may determine a TTI bundle size from the second control signal 513.

In some aspects, the first UE may receive a control signal 513 in the second TTI without receiving a control signal in the first TTI, e.g., as illustrated in the example in FIG. 5G. For example, the second data transmission may comprise an adjusted precoding parameter, where the second data transmission may comprise a same rank as the first data transmission in the first TTI. For example, a TTI duration of the second TTI may be unchanged from the first TTI. For example, the second TTI may be received without a control signal.

At 714, the first UE may receive a second data transmission. For example, reception component 804 and/or data component 808 of apparatus 802 may perform the reception of the second data transmission from UE 850. For example, referring back to FIGS. 5B-5G and FIG. 6, the first UE may receive a second data transmission 514, 620 from the second UE, e.g., in the second TTI, where the second data transmission may have one or more transmission parameters adapted based on the feedback 518 transmitted to the second UE.

At 716, the first UE may attempt to decode the second control signal 513 in the second TTI. For example, decoding component 816 of apparatus 802 may attempt to decode the second control signal. The first UE may receive each TTI independently in response to failure of decoding of the second control, at 718. For example, the first UE may monitor for a listen before talk (LBT) sequence for each TTI.

At 720, the first UE may receive a third data transmission from the second UE, e.g., in a third TTI. For example, reception component 804 and/or data component 808 of apparatus 802 may perform the reception of the third data transmission from UE 850. For example, the bundled TTI may further comprise the third TTI, where the second TTI may be separated from the first TTI by the third TTI. In this situation, in temporal order, the first UE may receive the first data transmission in the first TTI, the third data transmission in the third TTI, and then the second data transmission in the second TTI. For example, the bundled TTI may further comprise a third TTI, and where the second UE may further adapt the one or more transmission parameters for the third TTI based on the feedback transmitted to the second UE.

In some aspects, the feedback channel on which the feedback is transmitted may be power controlled based on at least one of an RSRP, a RSSI or a channel SNR. Thus, the first UE may determine a transmission power for the feedback 518 based on a power control level.

In some aspects, the feedback may be based on the predicted channel in the second TTI. For example, the feedback may comprises a prediction of a channel estimate for the second TTI. Since temporal correlations of the channel are known, the PMI/CQI feedback may be based on the predicted channel in the next TTI (or next few TTIs). For example, the channel may be predicted through interpolation.

Figure 8:
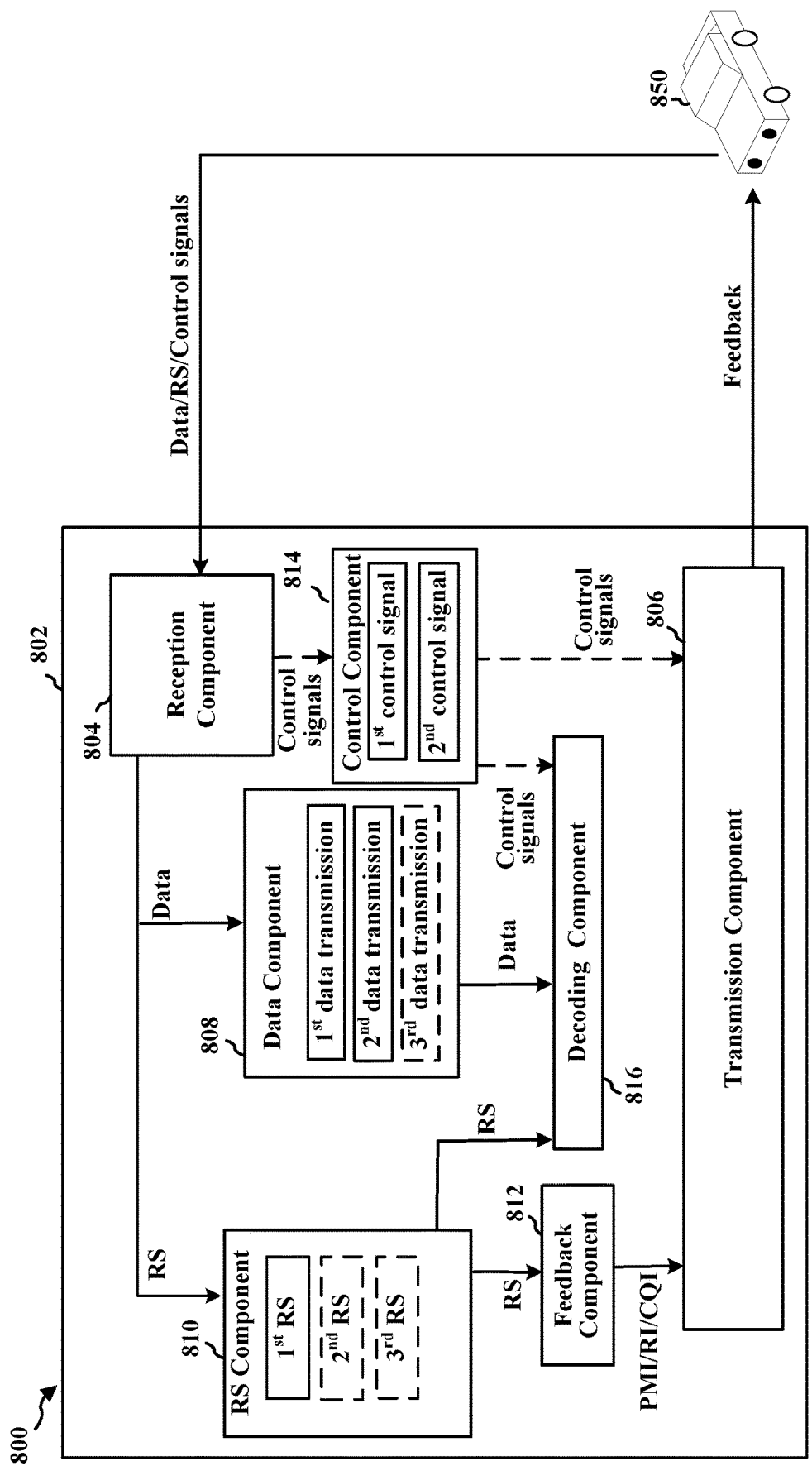
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a first UE (e.g., UE 104', 404, 604, 1150, the apparatus 802/802', etc.) communicating with a second UE (e.g., UE 104, 402, 602, 850, the apparatus 1102/1102', etc.) in a bundled TTI comprising a first TTI and a second TTI in a wireless communication. The apparatus 802 may correspond to the entire UE or to a component of the UE. The wireless communication may comprise a V2V or V2X communication, as described herein.

The apparatus includes a data component 808 that receives a first data transmission from the second UE 850, e.g., in the first TTI, and a second data transmission from the second UE 850, e.g., in the second TTI, e.g., via reception component 804. The apparatus includes a reference signal component 810 that receives a first reference signal, e.g., CSI-RS, via reception component 804. The apparatus includes a feedback component 812 that transmits a feedback to the second UE based on the first reference signal, e.g., via transmission component 806. The second data transmission may have one or more transmission parameters adapted based on the feedback transmitted to the second UE. The feedback provided by the feedback component 812 may be based on the first reference signal, e.g., CSI-RS.

In some aspects, the data component 808 may receive additional data transmissions, e.g., a third transmission.

In some aspects, the RS component 810 may receive a second reference signal, where the second reference signal may have one or more parameters based on the feedback transmitted to the second UE. For example, the second reference signal may comprise precoding adapted based on the feedback.

For example, the first reference signal may comprise a channel state information-reference signal (CSI-RS). In some aspects, the apparatus may receive a third reference signal in the first TTI, where the third reference signal for decoding data in the first TTI, wherein the CSI-RS is multiplexed with the third reference signal. In some aspects, the apparatus may receive a third reference signal in the first TTI, where the CSI-RS is received in a separate symbol than the third reference signal.

The apparatus may include a control component 814 for the received control signals. For example, the control component 814 may receive a first control signal indicating at least one of a target UE identification, a reference signal pattern, a transparent mode (TM), a rank indicator, a layer mapping and a precoding type, where the first control signal is received in the first TTI, which may be used to decode data. For example, the apparatus may receive a second control signal indicating an adjustment to the one or more transmission parameters for the second data transmission based on the feedback. For example, the one or more transmission parameters adapted based on the feedback may comprise one or more of a PMI, a RI, a CQI, a MCS, a number of layers, a number of ports, and a coding rate. For example, the first control signal may further indicate a potential for early termination of a data transmission.

The apparatus may include a decoding component 816 for decoding the data, reference signals and the control signals. For example, the apparatus may attempt to decode the second control signal in the second TTI, where the first apparatus receives each TTI independently in response to failure of decoding of the second control. For example, the apparatus may receive a control signal in the second TTI without receiving a control signal in the first TTI. For example, the apparatus may receive a third data transmission from the second UE in a third TTI, where the bundled TTI further comprises the third TTI, and where the second TTI is separated from the first TTI by the third TTI.

The apparatus may include additional components that perform each of the blocks of the algorithm in the aforementioned flowcharts of FIGS. 4, 5B-5G and 6-7. As such, each block in the aforementioned flowcharts of FIGS. 4, 5B-5G and 6-7 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

Figure 9:
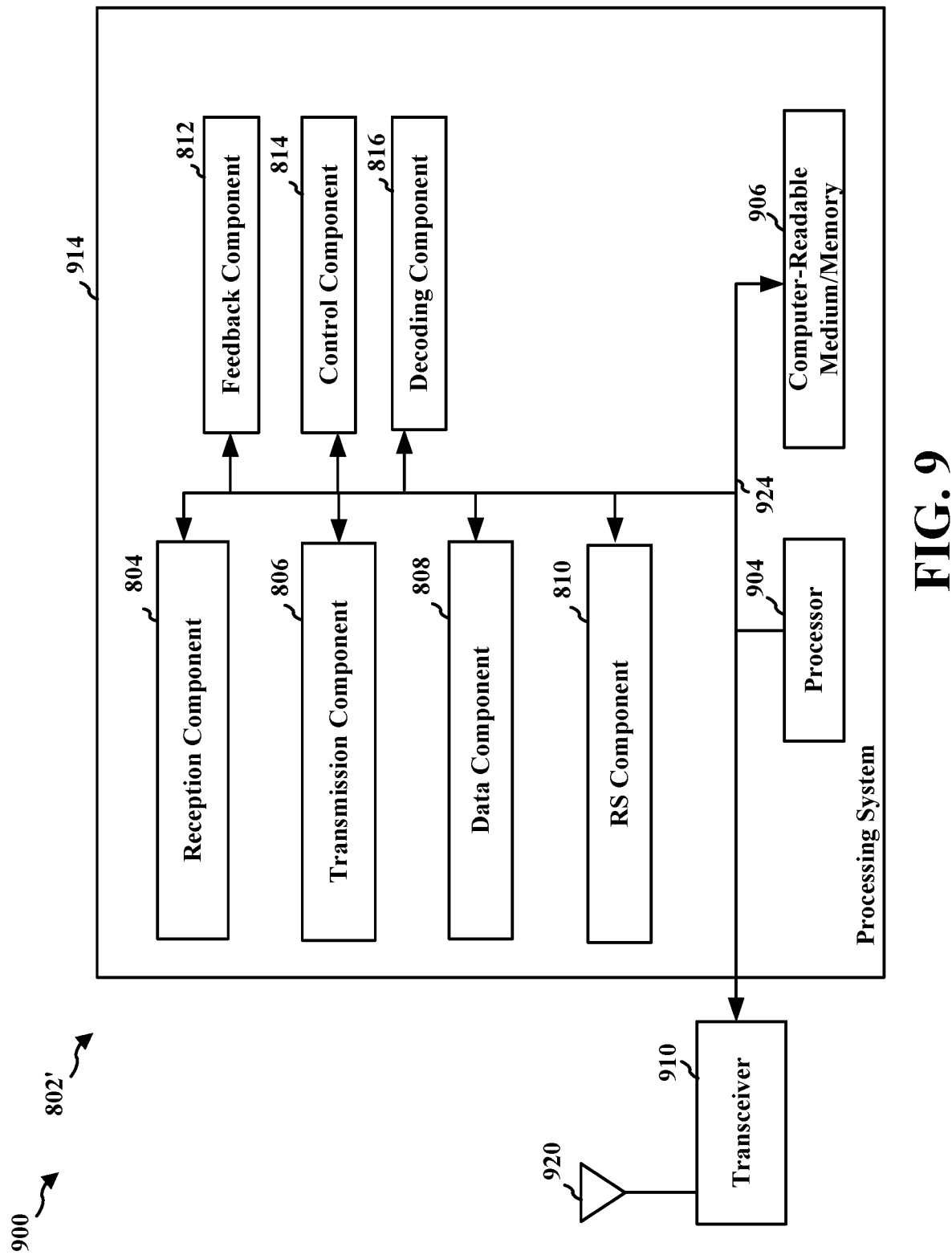
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 805, 806, 808, 810, 812, 814, 816 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 805, 806, 808, 810, 812, 814, 816. The components may be software components running in the processor 904, resident/stored in the computer readable medium/memory 906, one or more hardware components coupled to the processor 904, or some combination thereof. In one configuration, the processing system 914 may be a component of the UE 350 and may include the memory 360 and/or at least one of the TX processor 368, the RX processor 356, and the controller/processor 359. Alternatively, the processing system 914 may correspond to the entire UE.

In one configuration, the apparatus 802/802' for wireless communication includes means for receiving a first data transmission from a second UE in the first TTI (e.g., at least reception component 804, data component 808, memory 906, and/or processor 904.). The apparatus may include means for receiving a first reference signal from the second UE (e.g., at least reception component 804, RS component 810, memory 906, and/or processor 904). The apparatus may include means for transmitting a feedback to the second UE based on the first reference signal (e.g., at least transmission component 806, feedback component 812, memory 906, and/or processor 904). The apparatus may include means for receiving a second data transmission from the second UE in the second TTI, the second data transmission having one or more transmission parameters adapted based on the feedback transmitted to the second UE (e.g., at least reception component 804, RS component 810, memory 906, and/or processor 904). The apparatus may include means for receiving a second reference signal in the first TTI, the second reference signal for decoding data in the first TTI, wherein the CSI-RS is multiplexed with the second reference signal. The apparatus may include means for receiving a second reference signal in the first TTI, the second reference signal for decoding data in the first TTI, and wherein the CSI-RS is received in a separate symbol than the second reference signal (e.g., at least reception component 804, RS component 810, memory 906, and/or processor 904). The apparatus may include means for receiving a first control signal indicating at least one of a target UE identification, a reference signal pattern, a transparent mode (TM), a rank indicator, a layer mapping or a precoding type, wherein the first control signal is received in the first TTI (e.g., at least reception component 804, control component 814, memory 906, and/or processor 904). The apparatus may include means for receiving a second control signal indicating an adjustment to the one or more transmission parameters for the second data transmission (e.g., at least reception component 804, control component 814, memory 906, and/ or processor 904). The apparatus may include means for receiving a control signal in the second TTI, wherein the first UE determines a TTI bundle size from the control signal (e.g., at least reception component 804, control component 814, memory 906, and/or processor 904). The apparatus may comprise means for attempting to decode the first and second data transmissions. (e.g., at least decoding component 816, memory 906, and/or processor 904). The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

Figure 10:
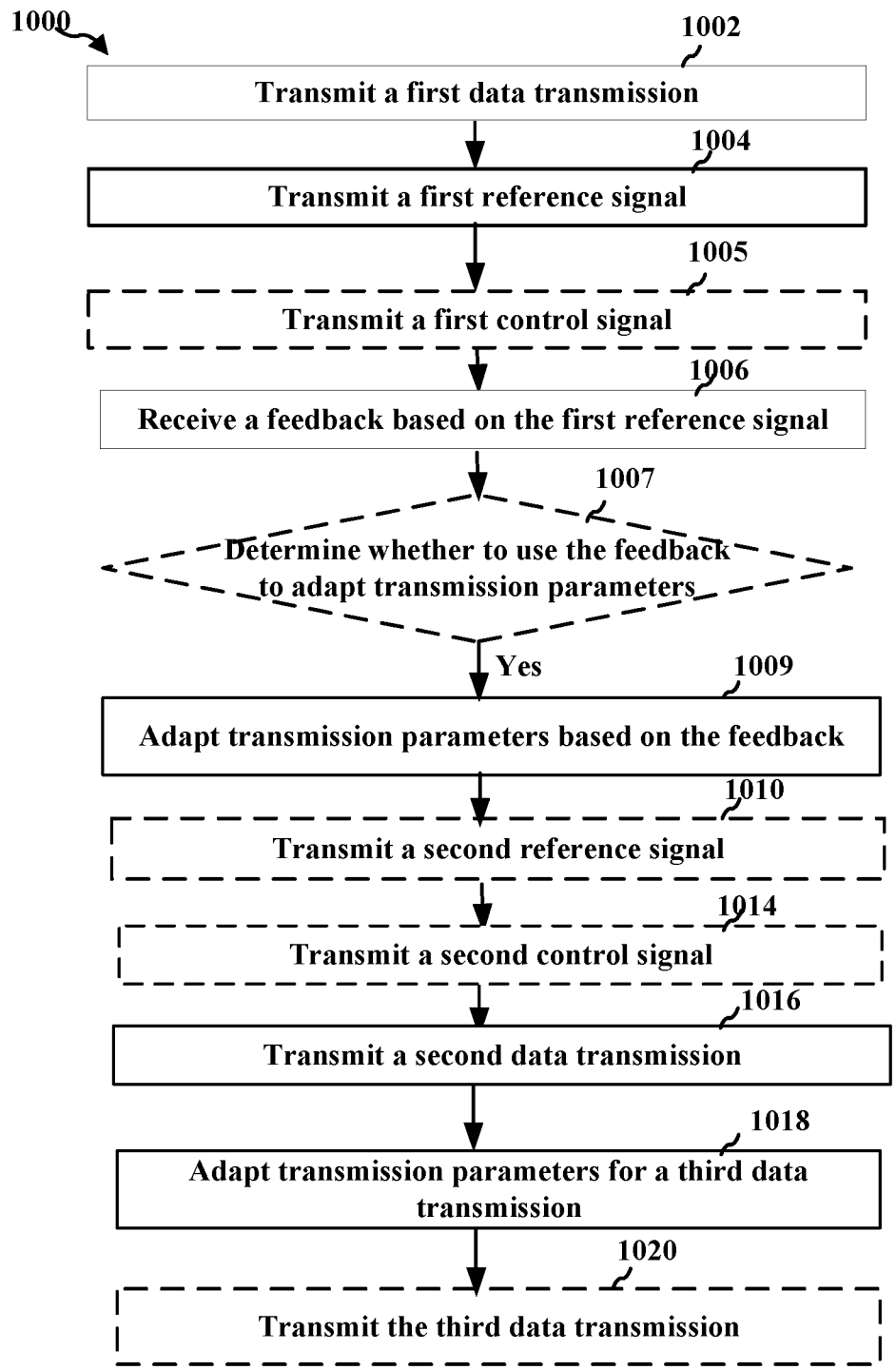
FIG. 10 is a flowchart of a method of wireless communication.

FIG. 10 is a flowchart 1000 of a method of wireless communication at a first UE. The method may be performed, for example, by the first UE (e.g., UE 104, 310, 402, 602, the apparatus 1102/1102', the processing system 1214, which may include the memory 360 and which may be the entire UE 310 or a component of the UE 310, such as the TX processor 316, the RX processor 370, and/or the controller/ processor 375). The UE may communicate directly with another UE (e.g., UE 104, 350, 404, 802, 604, 1150) using a bundled TTI comprising at least a first TTI and a second TTI in a wireless communication. The wireless communication may comprise a V2V or V2X communication. To facilitate an understanding of the techniques and concepts described herein, the method of flowchart 1000 may be discussed with reference to the examples illustrated in FIGS. 4, 5B-5G and 6. For discussion purposes, consider that the first UE may correspond to UE 602 in FIG. 6. Optional aspects may be illustrated in dashed lines.

In the method of flow chart 1000, the first UE may apply channel knowledge based on received feedback to adjust an MCS, modulation, code rate, rank and/or precoding to improve performance beyond a single port, non-precoded transmission. In this method, a link level scheme may be used that applies precoding based on feedback received from a receiver UE. The feedback may be based on the CSI-RS transmissions in the first TTI and may be used to determine improved transmission precoding, rank, etc. Applying channel knowledge to the MCS, modulation, code rate, rank and/or precoding determination may advantageously improve performance over a single port non-precoded transmission. In this way, the data rate, capacity, or special efficiency in communication may be improved.

At 1002, the first UE may transmit a first data transmission. For example, transmission component 1106 and/or data component 1108 of apparatus 1102 may perform the transmission of the first data transmission. For example, referring back to FIGS. 5B-5G and FIG. 6, the transmitter UE may transmit a first data transmission 508 and a first reference signal 511 directly to a receiver UE, e.g., in the first TTI 501b.

At 1104, the first UE may transmit a first reference signal (e.g., 511, 524) to the second UE, e.g., in the first TTI. For example, transmission component 1106 and/or RS component 1110 of apparatus 1102 may perform the transmission of the first RS. For example, referring back to FIGS. 5B-5G and FIG. 6, the transmitter UE may transmit a first data transmission 508 and a first reference signal 511 directly to a receiver UE, e.g., in the first TTI 501b. For example, the first reference signal 605 may be a CSI-RS signal, as described in connection with FIGS. 5B-5G. In some aspects, the first reference signal may comprise a CSI-RS. For example, CSI-RS may be transmitted together with a reference signal for decoding the data in the first TTI. For example, the first UE may receive a third reference signal (e.g., CRS, DM-RS, etc.) in the first TTI for decoding data in the first TTI, where the CSI-RS is multiplexed with the third reference signal. FIGS. 5B, 5C, 5F, and 5G illustrate examples of CSI-RS transmitted together with another reference signal, such as CRS, for decoding data 508. For example, the first reference signal 511 might not comprise precoding. For example, the first reference signal may comprise a cyclical precoding mechanism or a semi-static precoding known to the first UE. For example, the first UE may receive a third reference signal 525, e.g., in the first TTI for decoding data in the first TTI, where the CSI-RS 524 is received in a separate symbol than the third reference signal. FIGS. 5D and 5E illustrate examples in which the CSI-RS 524 is transmitted separately from another reference signal, e.g., DM-RS 525. For example, the CSI-RS may be received prior to the third reference signal 525, e.g., in a second symbol of the first TTI, as illustrated in FIG. 5E.

At 1005, the first UE may transmit a first control signal (e.g., 510) indicating at least one of a target UE identification, a reference signal pattern, a transparent mode (TM), a rank indicator, a layer mapping and a precoding type, where the first control signal may be transmitted in the first TTI. For example, transmission component 1106 and/or control component 1114 of apparatus 1102 may perform the transmission of the first control signal. For example, referring back to FIGS. 5B-5G and FIG. 6, the first UE may receive a first control signal 510, indicating at least one of a target UE identification, a reference signal pattern, a transparent mode (TM), a rank indicator, a layer mapping and a precoding type, where the first control signal may be received, e.g., in the first TTI. FIGS. 5B-5F illustrate examples in which the control signaling 510 is transmitted in the first TTI. In some aspects, the first UE may receive the first control signal 510, e.g., in the first TTI, where the first control signal may further indicate a potential for early termination of a data transmission.

At 1006, the first UE may receive a feedback (e.g., 518) to the second UE based on the first reference signal 511, 524. For example, reception component 1104 and/or feedback component 1112 of apparatus 1102 may perform reception of the feedback. For example, referring back to FIGS. 5B-5G and FIG. 6, the receiver UE may determine precoding and/or rank and/or channel quality based on CSI-RS in 511, and send the information in the feedback 518. For example, the front loaded CSI-RS based feedback 518 can enable the transmitter UE to adapt precoding and/or rank within bundled TTI based on in-time precoding/rank/channel quality (PMI/RI/CQI) feedback 518. The feedback 518 may comprise one or more of a PMI, a RI, or a CQI. As shown in FIG. 5B, the link level scheme may apply precoding based on the feedback 518 received from the receiver UE. The feedback 518 may be used by the transmitting UE to determine adapted transmission precoding/rank based on the CSI-RS transmissions in the first TTI 501b. As shown in FIG. 5B, the feedback 518 may be transmitted in the second TTI, e.g., in a first symbol in the second TTI 503b. For example, the feedback 518 may be transmitted after an acknowledgment or Negative acknowledgment (ACK/NACK) feedback 509 from the receiver UE.

At 1007, in some aspects, the first UE may determine whether to use the feedback to adapt the one or more transmission parameters for the second TTI based on an amount of data to be sent to the second UE. For example, determination component 1118 of apparatus 1102 may perform the determination. For example, referring back to FIGS. 5B-5G and FIG. 6, the front loaded feedback may increase overhead. CLSM may be applied when large amounts of data spanning multiple TTIs are to be communicated. For example, the front loaded feedback may be used to adapt the one or more transmission parameters for the second TTI when the number of TTI is larger than a threshold number.

At 1009, the first UE may adapt one or more transmission parameters for a second data transmission. For example, adapting component 1116 may perform the adaptation of the transmission parameters. For example, referring back to FIGS. 5B-5G and FIG. 6, the first UE may adapt one or more transmission parameters for a second data transmission 514, e.g., in the second TTI based on the feedback 518 received from the second UE. For example, the front loaded CSI-RS based feedback 518 can enable the transmitter UE to adapt precoding and/or rank within bundled TTI based on in-time precoding/rank/channel quality (PMI/RI/CQI) feedback 518. The feedback 518 may comprise one or more of a PMI, a RI, or a CQI. As shown in FIG. 5B, the link level scheme may apply precoding based on the feedback 518 received from the receiver UE. The feedback 518 may be used by the transmitting UE to determine adapted transmission precoding/rank based on the CSI-RS transmissions in the first TTI 501b.

At 1010, the first UE may transmit a second reference signal to the second UE in the second TTI. For example, transmission component 1106 and/or RS component 1110 of apparatus 1102 may perform the transmission of the second reference signal. For example, referring back to FIGS. 5B-5G and FIG. 6, the first UE may transmit a second reference signal 512 to the second UE, e.g., in the second TTI, where the second reference signal may have one or more parameters based on the feedback 518 transmitted to the second UE. For example, the feedback 518 may comprise one or more of a PMI, a RI, or a CQI. For example, the second reference signal may comprise precoding adapted based on the feedback. For example, the feedback may be transmitted in the first symbol in the second TTI, as illustrated in FIG. 5B. For example, the feedback may be transmitted after an acknowledgment or Negative acknowledgment (ACK/NACK) 509 from the receiver UE.

At 1014, the first UE may transmit a second control signal, e.g., 513, indicating an adjustment to the one or more transmission parameters for the second data transmission based on the feedback. For example, transmission component 1106 and/or control component 1114 of apparatus 1102 may perform the transmission of the second control signal. For example, referring back to FIGS. 5B-5G and FIG. 6, the second control signal may be transmitted in the second TTI. For example, the one or more transmission parameters adapted based on the feedback may comprise any combination of a PMI, a RI, a MCS, a CQI, a number of layers, a number of ports, and a coding rate. The second control signal 513 may be transmitted after the second reference signal 512, as in FIGS. 5B, 5F, and 5G. For another example, the second control signal 513 may be transmitted in a symbol prior to a second reference signal 512 in the second TTI, as illustrated in the example in FIG. 5C. For example, the second control signal 513 may comprise precoding, where the precoding may be determined based on the second reference signal 512. For example, the second control signal may be transmitted without precoding. For example, the first UE may transmit the second control signal 513 in the second TTI, where the second UE may determine a TTI bundle size from the second control signal 513. For example, the second UE may receive each TTI independently in response to failure of decoding of the second control signal. For example, the second UE may monitor for a listen before talk (LBT) sequence for each TTI.

In some aspects, the first UE may transmit a control signal 513 in the second TTI without transmitting a control signal in the first TTI. For example, the second data transmission may comprise an adjusted precoding parameter, where the second data transmission may comprise a same rank as the first data transmission in the first TTI. For example, a TTI duration of the second TTI is unchanged from the first TTI. For example, the second TTI is transmitted without a control signal.

At 1016, the first UE may transmit the second data transmission to the second UE in the second TTI. For example, transmission component 1106 and/or data component 1108 of apparatus 1102 may perform the transmission of the second data transmission. For example, referring back to FIGS. 5B-5G and FIG. 6, the first UE may transmit the second data transmission 514 to the second UE, e.g., in the second TTI, where the second data transmission 514 may have the one or more transmission parameters adapted based on the feedback 518 received from the second UE.

At 1018, the first UE may adapt the one or more transmission parameters for the third TTI. For example, the bundled TTI may further comprise a third TTI, where the first UE may further adapt the one or more transmission parameters for the third TTI based on the feedback received from the second UE.

At 1020, the first UE may transmit a third data transmission to the second UE in a third TTI. For example, transmission component 1106 and/or data component 1108 of apparatus 1102 may perform the transmission of the third data transmission. For example, the bundled TTI may further comprise the third TTI, where the second TTI may be separated from the first TTI by the third TTI. In this situation, in temporal order, the first UE may transmit the first data transmission in the first TTI, the third data transmission in the third TTI, and then the second data transmission in the second TTI.

In some aspects, the feedback channel on which the feedback is received is power controlled based on at least one of a RSRP, a RSSI or a channel SNR.

In some aspects, the feedback may be based on the predicted channel in the second TTI. For example, the feedback may comprises a prediction of a channel estimate for the second TTI. Since temporal correlations of the channel are known, the PMI/CQI feedback may be based on the predicted channel in the next TTI (or next few TTIs). For example, the channel may be predicted through interpolation.

Figure 11:
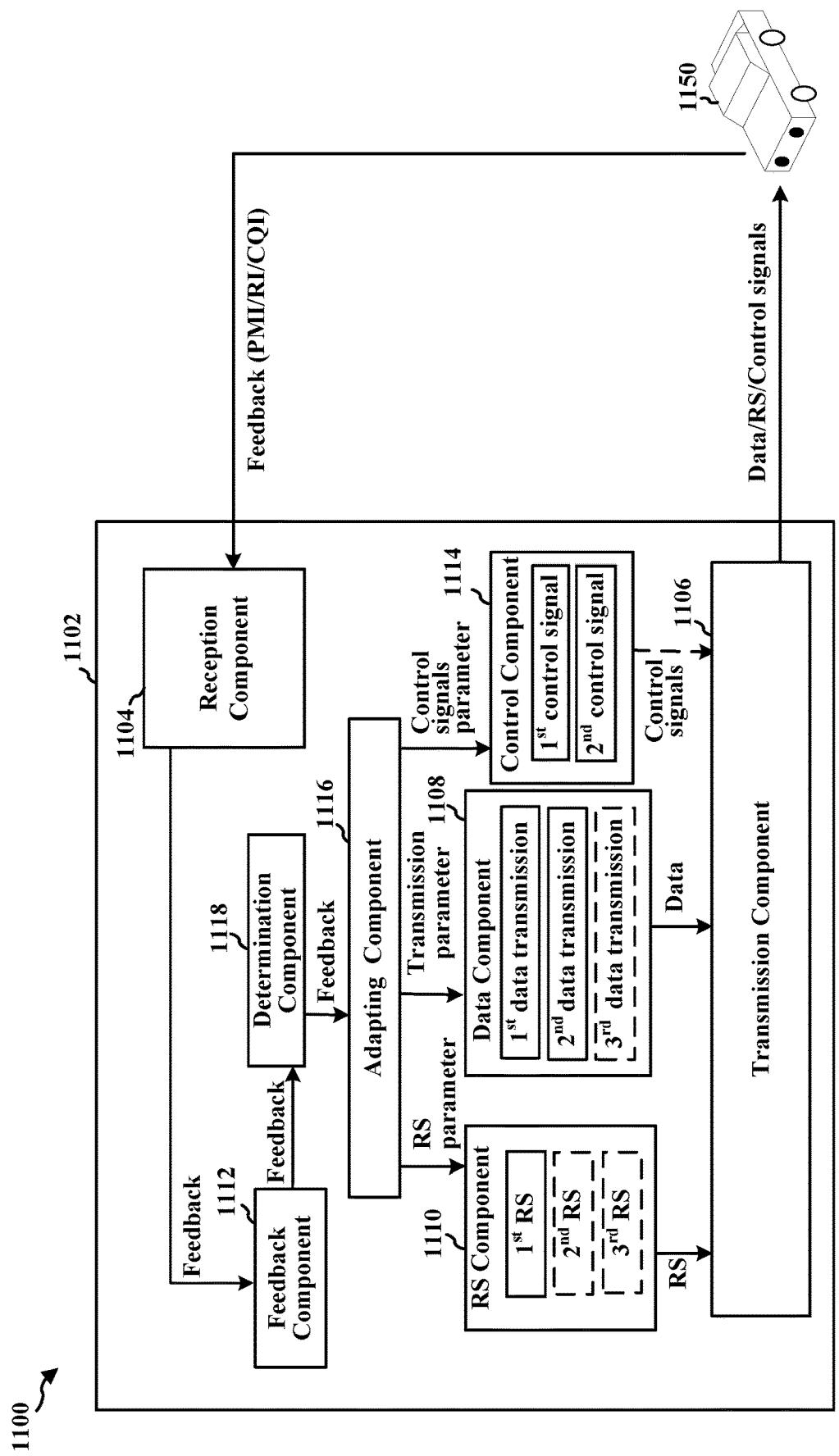
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a first UE or a component of a first UE (e.g., UE 104, 402, 602, 1150, the apparatus 1102/1102', etc.) communicating with a second UE (e.g., UE 104', 404, 604, 1150, the apparatus 802/802', etc.) in a bundled TTI comprising a first TTI and a second TTI in a wireless communication. The wireless communication may comprise a V2V or V2X communication, as described herein.

The apparatus includes a data component 1108 that transmits, via the transmission component 1106, a first data transmission to the second UE 1150, e.g., in the first TTI. The apparatus includes an RS component that transmits, via transmission component 1106, a first reference signal to the second UE 1150 in the first TTI. The data component 1108 further transmits, via the transmission component 1108, a second data transmission to the second UE 1150, e.g., in the second TTI. The apparatus includes a reception component 1104 that receives communication from the second UE 1150. The apparatus includes a feedback component 1112 that receives, via the reception component 1104, a feedback from the second UE 1150 based on the first reference signal. The second data transmission may have one or more transmission parameters adapted based on the feedback received from the second UE 1150. Thus, the apparatus may include an adapting component 1116 for adapting one or more transmission parameters for the second data transmission in the second TTI based on the feedback received from the second UE 1150. The adapted parameters may be provided from the adaptating component 1116 to the data component 1108, RS component 1110, and control component 1114.

The data component 1108 may transmit additional TTIs to the second UE, e.g., in a third transmission.

In some aspects, the RS component 1110 may transmit a second reference signal, where the second reference signal may have one or more parameters based on the feedback transmitted to the second UE. For example, the second reference signal may comprise precoding adapted based on the feedback.

For example, the first reference signal generated by the RS component 1110 may comprise a CSI-RS. In some aspects, the RS component 1110 may transmit a third reference signal in the first TTI, where the third reference signal for decoding data in the first TTI, where the CSI-RS is multiplexed with the third reference signal. In some aspects, the apparatus may transmit a third reference signal in the first TTI, where the CSI-RS is transmitted in a separate symbol than the third reference signal.

The apparatus may include a control component 1114 for transmitting control signals to the second UE 1150. For example, the apparatus may transmit a first control signal indicating at least one of a target UE identification, a reference signal pattern, a transparent mode (TM), a rank indicator, a layer mapping and a precoding type, where the first control signal is transmitted in the first TTI. For example, the apparatus may transmit a second control signal indicating an adjustment to the one or more transmission parameters for the second data transmission based on the feedback. For example, the one or more transmission parameters adapted based on the feedback may comprise one or more of a precoding matrix indicator (PMI), a rank indicator (RI), a modulation and coding scheme (MCS), a channel quality indicator (CQI), a number of layers, a number of ports, and a coding rate.

For example, the first control signal may further indicate a potential for early termination of a data transmission. For example, the second UE 1150 may attempt to decode the second control signal in the second TTI, where the second UE 1150 may receive each TTI independently in response to failure of decoding of the second control. For example, the apparatus may transmit a control signal in the second TTI without transmitting a control signal in the first TTI. For example, the apparatus may transmit a third data transmission to the second UE 1150 in a third TTI, where the bundled TTI may further comprise the third TTI, and where the second TTI is separated from the first TTI by the third TTI. For example, the apparatus may transmit a third data transmission to the second UE 1150 in a third TTI, where the bundled TTI further may comprise the third TTI, and wherein the apparatus may further adapt the one or more transmission parameters for the third TTI based on the feedback received from the second UE.

The apparatus may include a determination component 1118 for determining whether to use the feedback to adapt the one or more transmission parameters for the second TTI based on an amount of data to be sent to the second UE. For example, the front loaded feedback may increase overhead. CLSM may be applied when large amounts of data spanning multiple TTIs are to be communicated. For example, the front loaded feedback may be used to adapt the one or more transmission parameters for the second TTI when the number of TTI is larger than a threshold number.

The apparatus may include additional components that perform each of the blocks of the algorithm in the aforementioned flowcharts of FIGS. 4, 5B-5G, 6-7 and 10. As such, each block in the aforementioned flowcharts of FIGS. 4, 5B-5G, 6-7 and 10 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

Figure 12:
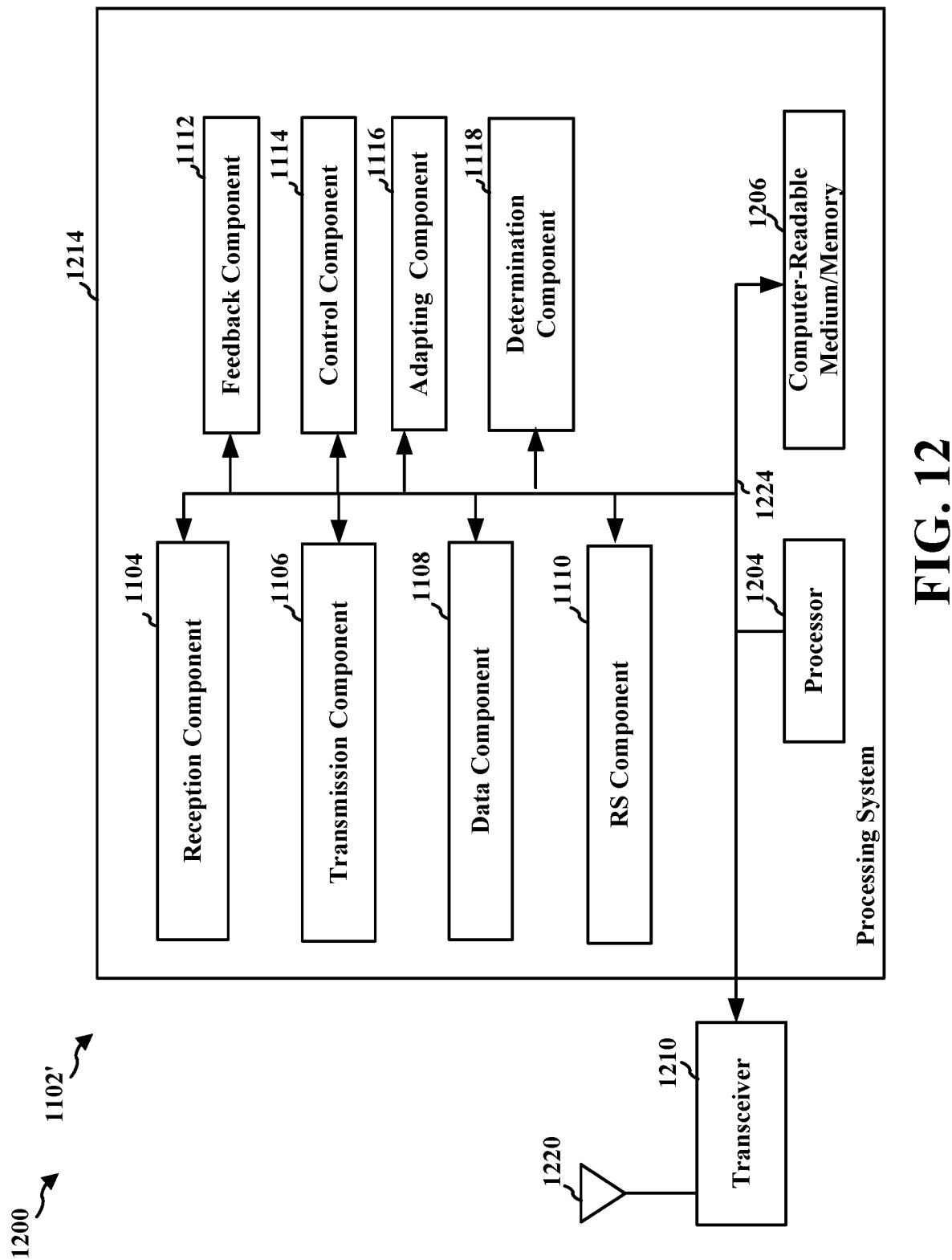
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 910 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118. The components may be software components running in the processor 1204, resident/stored in the computer readable medium/memory 1206, one or more hardware components coupled to the processor 1204, or some combination thereof. In one configuration, the processing system 1214 may be a component of the UE 350 and may include the memory 360 and/or at least one of the TX processor 368, the RX processor 356, and the controller/ processor 359. Alternatively, the processing system 1214 may correspond to the entire UE.

In one configuration, the apparatus 1102/1102' for wireless communication includes means for transmitting a first data transmission to a second UE in the first TTI (e.g., at least transmission component 1106, data component 1108, memory 1206 and/or processor 1204). The apparatus may include means for transmitting a first reference signal to the second UE (e.g., at least transmission component 1106, RS component 1110, memory 1206 and/or processor 1204). The apparatus may include means for receiving a feedback from the second UE based on the first reference signal (e.g., at least reception component 1104, feedback component 1112, memory 1206 and/or processor 1204). The apparatus may include means for adapting one or more transmission parameters for a second data transmission in the second TTI based on the feedback received from the second UE (e.g., at least transmission component 1106, adapting component 1116, memory 1206 and/or processor 1204). The apparatus may include means for transmitting a second data transmission from the second UE in the second TTI, the second data transmission having one or more transmission parameters adapted based on the feedback transmitted to the second UE (e.g., at least transmission component 1106, data component 1108, memory 1206 and/or processor 1204). The apparatus may include means for transmitting a control signal (e.g., at least transmission component 1106, control component 1114, memory 1206 and/or processor 1204). The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   receiving a first data transmission directly from a second UE in a first transmission time interval (TTI);
   receiving a first reference signal directly from the second UE in the first TTI;
   transmitting, to the second UE, information indicative of channel quality based on the first reference signal, the information being adjacent to an acknowledgment or negative acknowledgment (ACK/NACK) in at least one of the first TTI or a second TTI consecutively following the first TTI; and
   receiving a second data transmission from the second UE having one or more transmission parameters of the second TTI adapted based on: (i) the information indicative of channel quality transmitted to the second UE, and (ii) an amount of data in the second data transmission.

2. The method of claim 1, wherein the first reference signal comprises a channel state information-reference signal (CSI-RS).

3. The method of claim 2, wherein the CSI-RS is multiplexed with a second reference signal.

4. The method of claim 2, wherein the CSI-RS is received in a single symbol of the first TTI.

5. The method of claim 1, wherein the first UE and the second UE communicate using vehicle-to-everything (V2X) communication or vehicle-to-vehicle (V2V) communication.

6. The method of claim 1, wherein the information indicative of channel quality is transmitted after the ACK/NACK.

7. The method of claim 1, wherein the information indicative of channel quality is transmitted prior to the ACK/NACK.

8. The method of claim 1, wherein a second reference signal comprises rank or precoding adapted based on the information indicative of channel quality.

9. The method of claim 8, wherein the first reference signal does not comprise precoding.

10. The method of claim 8, wherein the first reference signal comprises a cyclical precoding mechanism or a semi-static precoding known to the first UE.

11. The method of claim 1, further comprising:
    receiving a first control signal indicating at least one of a target UE identification, a reference signal pattern, or a rank indicator (RI), wherein the first control signal is received in the first TTI.

12. The method of claim 11, further comprising:
    receiving a second control signal indicating an adjustment to the one or more transmission parameters for the second data transmission, wherein the one or more transmission parameters adapted comprises one or more of a precoding matrix indicator (PMI), a rank indicator (RI), a modulation and coding scheme (MCS), a channel quality indicator (CQI), a number of layers, a number of ports, or a coding rate.

13. The method of claim 1, further comprising:
    receiving a control signal in the second TTI, wherein the first UE determines a TTI bundle size from the control signal.

14. The method of claim 1, wherein the second data transmission comprises an adjusted precoding parameter, wherein the second data transmission comprises a same rank as the first data transmission in the first TTI.

15. The method of claim 14, wherein the second TTI is transmitted without a control signal.

16. The method of claim 1, wherein a channel on which the information indicative of channel quality is transmitted is power controlled based on at least one of a received reference signal received power (RSRP), a Received Signal Strength Indicator (RSSI) or a channel Signal-to-Noise Ratio (SNR).

17. The method of claim 1, wherein the information indicative of channel quality comprises a prediction of a channel estimate for the second TTI.

18. An apparatus for wireless communication at a first user equipment (UE), comprising:
    a memory; and at least one processor coupled to the memory and configured to:
- receive a first data transmission directly from a second UE in a first transmission time interval (TTI);
- transmit, to the second UE, information indicative of channel quality based on the first reference signal, the information being adjacent to an acknowledgment or negative acknowledgment (ACK/NACK) in at least one of the first TTI or a second TTI consecutively following the first TTI; and
- receive a second data transmission from the second UE having one or more transmission parameters of the second TTI adapted based on: (i) the information indicative of channel quality transmitted to the second UE, and (ii) an amount of data in the second data transmission.

19. A method of wireless communication at a first user equipment (UE), comprising:
- transmitting a first data transmission directly to a second UE in a first transmission time interval (TTI);
- transmitting a first reference signal directly to the second UE in the first TTI;
- receiving, from the second UE, information indicative of channel quality based on the first reference signal, the information being adjacent to an acknowledgment or negative acknowledgment (ACK/NACK) in at least one of the first TTI or a second TTI consecutively following the first TTI;
- determining whether to adapt one or more transmission parameters of the second TTI based on: (i) the information indicative of channel quality received from the second UE, and (ii) an amount of data to be sent to the second UE in a second data transmission; and
- transmitting the second data transmission to the second UE, the second data transmission having the one or more transmission parameters adapted based on the information indicative of channel quality received from the second UE.

20. The method of claim 19, wherein the first UE and the second UE communicate using vehicle-to-everything (V2X) communication or vehicle-to-vehicle (V2V) communication.

21. The method of claim 19, further comprising transmitting a second reference signal to the second UE in the second TTI, wherein the second reference signal comprises precoding adapted based on the information indicative of channel quality.

22. The method of claim 19, wherein the first reference signal comprises a channel state information-reference signal (CSI-RS).

23. The method of claim 22, further comprising transmitting a second reference signal in the first TTI, the second reference signal for decoding data in the first TTI, wherein the CSI-RS is multiplexed with the second reference signal.

24. The method of claim 22, further comprising transmitting a second reference signal in the first TTI, the second reference signal for decoding data in the first TTI, and wherein the CSI-RS is transmitted in a separate symbol than the second reference signal.

25. The method of claim 19, further comprising:
- transmitting a first control signal indicating at least one of a target UE identification, a reference signal pattern, a transparent mode (TM), a first rank indicator (RI), a layer mapping and a precoding type; wherein the first control signal is transmitted in the first TTI; and
- transmitting a second control signal indicating an adjustment to the one or more transmission parameters for the second data transmission, wherein the one or more transmission parameters adapted based on the information indicative of channel quality comprises one or more of a precoding matrix indicator (PMI), a second RI, a modulation and coding scheme (MCS), a channel quality indicator (CQI), a number of layers, a number of ports, and a coding rate.

26. An apparatus for wireless communication at a first user equipment (UE), comprising:
- a memory; and
- at least one processor coupled to the memory and configured to:
  - transmit a first data transmission directly to a second UE in a first transmission time interval (TTI);
  - transmit a first reference signal directly to the second UE in the first TTI;
  - receive, from the second UE, information indicative of channel quality based on the first reference signal, the information being adjacent to an acknowledgment or negative acknowledgment (ACK/NACK) in at least one of the first TTI or a second TTI consecutively following the first TTI;
  - determine whether to adapt one or more transmission parameters of the second TTI based on: (i) the information indicative of channel quality received from the second UE, and (ii) an amount of data to be sent to the second UE in a second data transmission; and
  - transmit the second data transmission to the second UE, the second data transmission having the one or more transmission parameters adapted based on the information indicative of channel quality received from the second UE.

27. The method of claim 1, wherein the information indicative of channel quality comprises indicates at least one of a precoding matrix indicator (PMI), a rank indicator (RI), a modulation and coding scheme (MCS), a channel quality indicator (CQI), a number of layers, a number of ports, and a coding rate.

28. The method of claim 1, wherein the ACK/NACK is carried in a last symbol of the first TTI, and the information is adjacent to the ACK/NACK in one of a penultimate symbol of the first TTI immediately before the last symbol or in a first symbol of the second TTI consecutively following the first TTI.

* * * * *